US008023032B2

(12) United States Patent
Yoshikawa et al.

(10) Patent No.: US 8,023,032 B2
(45) Date of Patent: *Sep. 20, 2011

(54) IMAGE DISPLAY METHOD, PROGRAM, AND IMAGE DISPLAY APPARATUS

(75) Inventors: Tomoyasu Yoshikawa, Kanagawa (JP);
Shuntaro Aratani, Tokyo (JP);
Tomoyuki Ohno, Kanagawa (JP);
Katsuhiro Miyamoto, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/360,298

(22) Filed: Jan. 27, 2009

(65) Prior Publication Data

US 2009/0142005 A1    Jun. 4, 2009

Related U.S. Application Data

(62) Division of application No. 10/869,919, filed on Jun. 18, 2004, now Pat. No. 7,600,191.

(30) Foreign Application Priority Data

Jun. 20, 2003  (JP) .................................. 2003-176856
Feb. 24, 2004  (JP) .................................. 2004-048430

(51) Int. Cl.
  *H04N 5/222*  (2006.01)
  *G06K 9/20*   (2006.01)
  *G06K 9/66*   (2006.01)
  *G09G 5/00*   (2006.01)
  *G06F 3/048*  (2006.01)

(52) U.S. Cl. ................... 348/333.05; 382/282; 382/190; 345/629; 715/790

(58) Field of Classification Search ......... 348/333.01–333.07; 715/790, 715/791, 764; 382/214, 190; 345/665, 629, 345/421
See application file for complete search history.

(56) References Cited

U.S. PATENT DOCUMENTS

| 6,570,582 | B1  | 5/2003  | Sciammarella et al. ...... 345/660 |
| 6,614,439 | B2  | 9/2003  | Matsumoto et al. .......... 345/530 |
| 6,970,199 | B2* | 11/2005 | Venturino et al. ....... 348/333.02 |
| 7,068,309 | B2  | 6/2006  | Toyama et al. ............ 348/231.5 |
| 7,600,191 | B2* | 10/2009 | Yoshikawa et al. ........... 715/790 |
| 2002/0032696 | A1 | 3/2002 | Takiguchi et al. ......... 707/500.1 |
| 2002/0033848 | A1 | 3/2002 | Sciammarella et al. ...... 345/838 |
| 2002/0181784 | A1 | 12/2002 | Shiratani ..................... 382/218 |
| 2003/0113037 | A1 | 6/2003 | Yoda ............................ 382/302 |

FOREIGN PATENT DOCUMENTS

| JP | 8-171471   | 7/1996  |
| JP | 9-259130   | 10/1997 |
| JP | 2000-137791 | 5/2000  |

(Continued)

*Primary Examiner* — Lin Ye
*Assistant Examiner* — Euel K Cowan
(74) *Attorney, Agent, or Firm* — Fitzpatrick, Cella, Harper & Scinto

(57) ABSTRACT

A table is allocated indexes corresponding to display positions on a monitor screen, respectively, and data indicating an unexposed part at each of the display positions is stored in each index of the table. Focal position information is acquired from Exif header information on image data of an image, and a location of one of the indexes in the table at which no image data is registered is searched in an ascending order of the indexes. According to the table, the images are arranged so that the focal position of each image differs from the unexposed part at the display position of the image.

10 Claims, 27 Drawing Sheets

1101

FOREIGN PATENT DOCUMENTS

| | | | |
|---|---|---|---|
| JP | 2000-138814 | * | 5/2000 |
| JP | 2000-276484 | | 10/2000 |
| JP | 2001-306375 | | 11/2001 |
| JP | 2001-312349 | | 11/2001 |
| JP | 2002-111896 | * | 4/2002 |
| JP | 2002-111896 A | | 4/2002 |
| JP | 2002-358522 | | 12/2002 |
| JP | 2003-6666 | | 1/2003 |
| JP | 2003-078743 | * | 3/2003 |
| KR | 1998-048945 | | 9/1998 |
| WO | 02/080537 A2 | | 10/2002 |

* cited by examiner

FIG. 5

| TABLE INDEX | POSITION NUMBER | UNEXPOSED PART | DISPLAY POSITION | ARRANGED IMAGE FILE |
|---|---|---|---|---|
| 1 | ① | LEFT | 600,350 | |
| 2 | ② | RIGHT | 40,80 | IMG0001.jpg |
| 3 | ③ | LEFT | 340,200 | |
| 4 | ④ | LEFT | 600,100 | |
| 5 | ⑤ | RIGHT | xxx,yyy | |
| 6 | ⑥ | LEFT | xxx,yyy | |
| 7 | ⑦ | RIGHT | xxx,yyy | |
| 8 | ⑧ | RIGHT | xxx,yyy | |
| 9 | ⑨ | RIGHT | xxx,yyy | |
| 10 | ⑩ | — | xxx,yyy | |
| 11 | ⑪ | — | xxx,yyy | |
| 12 | ⑫ | — | xxx,yyy | |

FIG. 6A
FIG. 6B
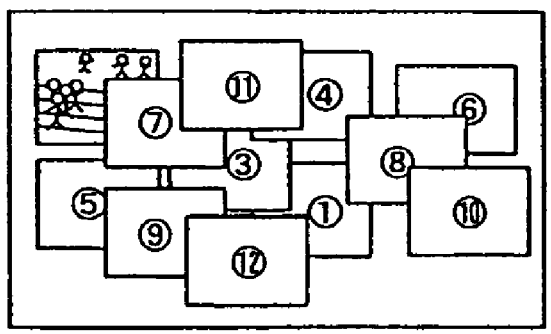
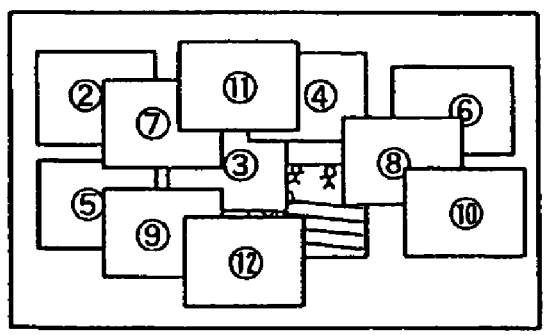

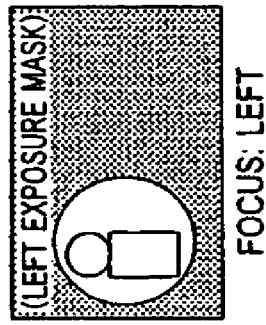
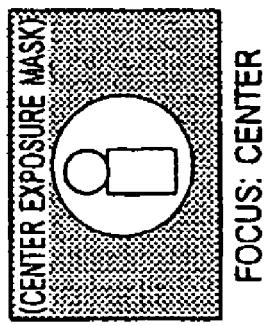
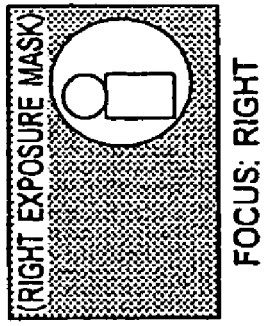
FIG. 8A  FOCUS: LEFT (LEFT EXPOSURE MASK) | FOCUS: CENTER (CENTER EXPOSURE MASK) | FOCUS: RIGHT (RIGHT EXPOSURE MASK)
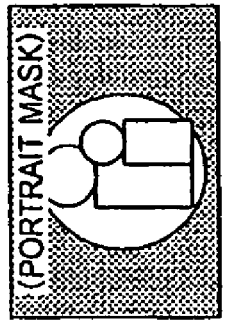
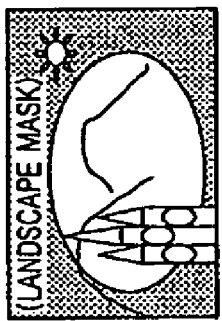
FIG. 8B  PORTRAIT MODE (PORTRAIT MASK) | LANDSCAPE MODE (LANDSCAPE MASK)
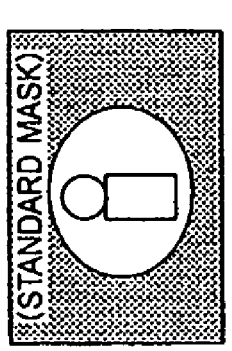
FIG. 8C  AUTO-MODE (FOCUS: NONE) (STANDARD MASK)

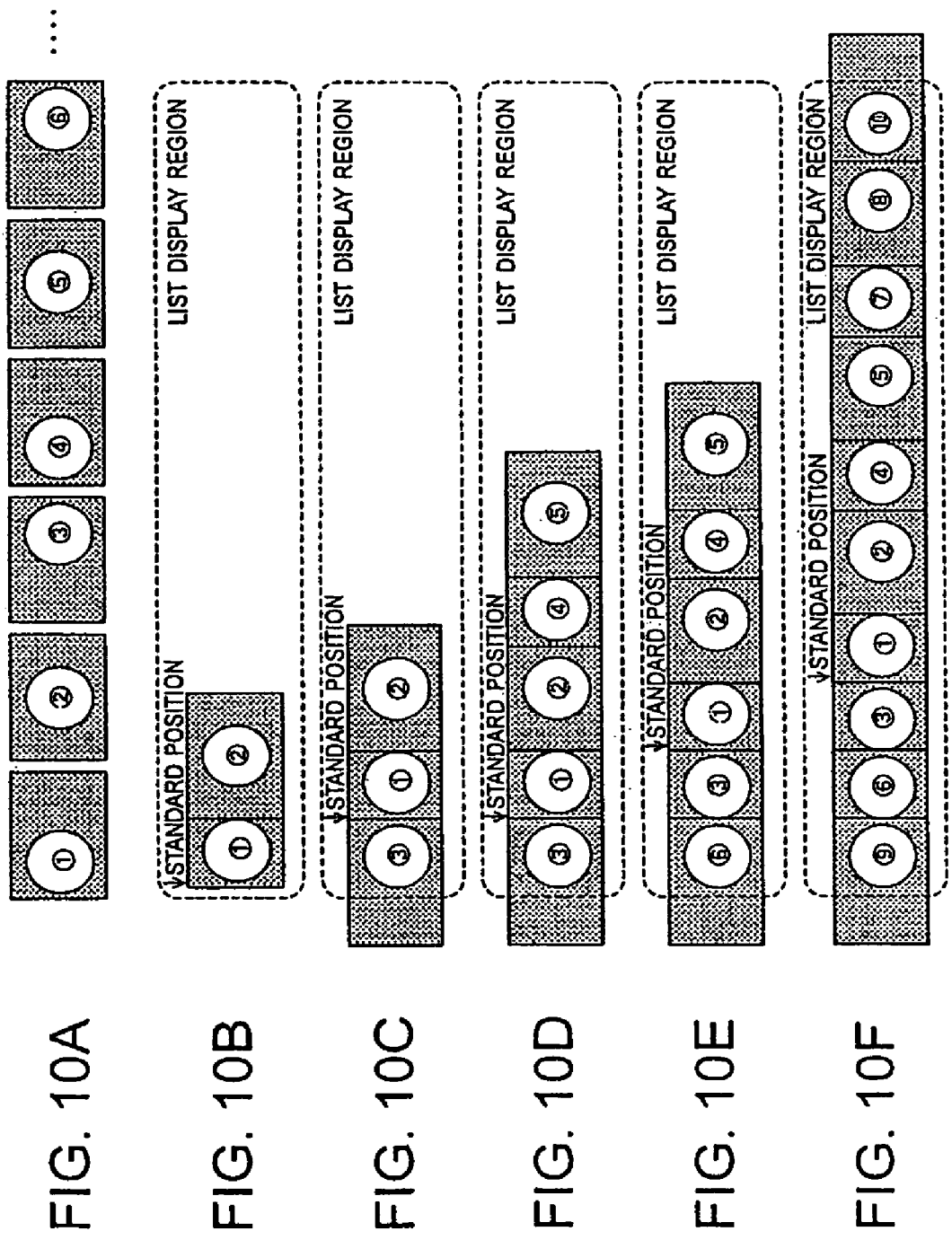

FIG. 15A
FIG. 15B
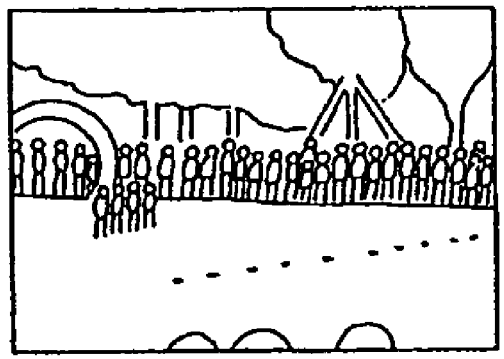
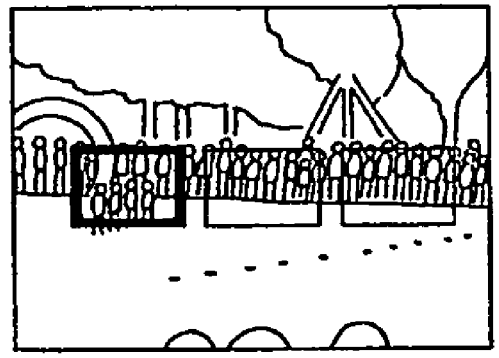
FOCAL POSITION: LEFT

FIG. 16
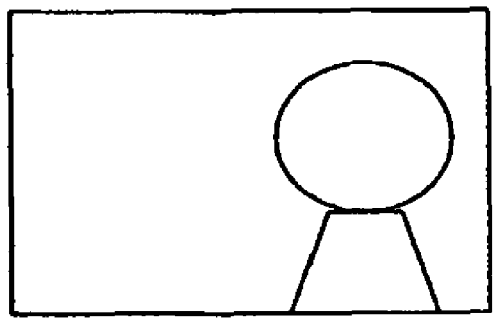
PERSON ON THE RIGHT
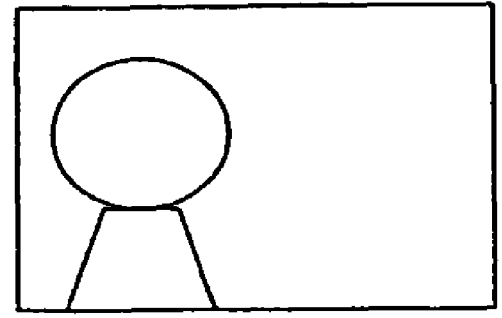
PERSON ON THE LEFT

IMAGE DISPLAY METHOD, PROGRAM, AND IMAGE DISPLAY APPARATUS

RELATED APPLICATIONS

This application is a division of U.S. patent application Ser. No. 10/869,919, filed on Jun. 18, 2004, (now allowed), which is incorporated by reference herein in its entirety, as if fully set forth herein, and claims the benefit of priority under 35 U.S.C. §119, based on Japanese Priority Application Nos. JP 2003-176856, filed Jun. 20, 2003, and JP 2004-048430, filed Feb. 24, 2004, which are incorporated by reference herein in their entirety, as if fully set forth herein.

BACKGROUND OF THE INVENTION

1. Field of the Invention

The present invention relates to an image display method for displaying digital image data on a television monitor screen.

2. Description of the Related Art

Following start of digital high-vision broadcasting, television receivers for digital high-vision have spread widely, thus enabling users to enjoy higher-quality and more impressive videos at home than before. Further, electronic still cameras have spread, so that users have increasingly displayed and enjoyed electronic still images and moving images not only on screens of personal computers but also television monitor screens.

To view still images or moving images using a television receiver, a user normally looks at a list of thumbnail images displayed on a television monitor screen, selects one of the thumbnail images, and thereby selects data to be reproduced.

Meanwhile, memories with rapidly increased storage capacities have recently been available. The number of images to be stored is increasing by leaps and bounds, accordingly. A memory card, for example, can store over 500 digital photographs.

It has been difficult for the user to find desired data from among image data in large quantities.

Examples of a technique for efficiently arranging large quantities of data objects on the monitor screen, and for enabling the user himself or herself to easily select one of the objects with user's own eyes include a technique for moving thumbnail images while overlapping them, and for facilitating finding desired data as disclosed in Japanese Patent Application Laid-Open (JP-A) No. 2001-306375. They also include a technique, disclosed in JP-A No. 9-259130, for displaying image data in a three-dimensional space, moving a virtual eye view, and thereby finding desired data.

The conventional techniques have, however, the following disadvantages. Since the thumbnail images are displayed while being overlapped with the other thumbnail images, important parts for discrimination of photographs are often hidden. A photograph A and a photograph B are present, for example, as shown in FIGS. 14A and 14B. In the photograph A, children who are "running in a race" on the left of the image is an important part. In the photograph B, a person on the right of the image is an important part. If these photographs A and B are displayed while being overlapped with the other photographs, the photographs A and B are displayed with their important parts hidden as shown in FIG. 14A.

To prevent them, as proposed in the JP-A Nos. 2001-306375 and 9-259130 stated above, there is no other choice but for the user to carry out operations such as scrawling of the displayed image or moving a position of a virtual eye view so as to be able to view the important part of each photograph, and then to discriminate the photograph.

The present invention has been achieved in light of the conventional disadvantages. It is an object of the present invention to provide an image display method which enables a user to easily find a desired image while large quantities of images are efficiently arranged on a monitor screen.

Further, each of almost all photographed digital images can be divided into a region which a photographer regards as a subject and the other region. The former region will be referred hereafter to as "region of interest" and the latter region will be referred to as "region of no interest".

If an operator of an image display apparatus is to search a desired image from large quantities of digital images, it is considered that the operator determines the desired image based on the region of interest in each of the digital images.

Conventionally, to create a thumbnail image, image data is uniformly reduced without discriminating the region of interest from the region of no interest. Due to this, when a plurality of images are displayed as a list of thumbnail images, the regions of interest in the respective images are displayed in small sizes. As a result, it is disadvantageously difficult to find a desired image based on the regions of interest as criteria of determination while looking down on the large quantities of digital images.

Considering the disadvantage, a method for detecting a face area in an image, enlarging the detected face area, and displaying a thumbnail image in a list is proposed, as disclosed in JP-A No. 2002-358522. According to this method, a system having an improved performance for searching a desired digital image can be realized by detecting the face area as the region of interest, enlarging the detected face area, and displaying the enlarged region.

With this method, since the list of thumbnail images is displayed with the respective regions of interest enlarged, the number of images which can be displayed once on the monitor screen is fixed in advance. Due to this, if the number of images exceeding the fixed number of images which can be displayed once on the monitor screen, such functions as a scrawling function and a function of turning over pages are additionally required, thereby disadvantageously complicating user's operation.

In addition, if both enlarged regions of interest and original images are displayed as thumbnail images, the number of images which can be displayed once on the monitor screen is disadvantageously, further reduced.

If the face area cannot be detected from a target image, no measures can be disadvantageously taken.

SUMMARY OF THE INVENTION

According to one aspect of the present invention, there is provided an image display method comprising a step of simultaneously displaying a plurality of images on a screen while overlapping at least two images with each other, the method comprising steps of: acquiring related information associated with the at least two images; and determining which of the at least two images is arranged at an upper position when overlapping the at least two images based on the acquired related information.

According to another aspect of the present invention, there is provided an image display method comprising a step of simultaneously displaying a plurality of images on a screen while overlapping at least two images with each other, the method comprising steps of: acquiring related information associated with the at least two images; and determining both of or one of an exposure amount and an exposure position of the other one of the at least two images, which has a hidden part and an exposed part as a result of overlapping one of the at least two images with the other image, based on the acquired related information.

According to yet another aspect of the present invention, there is provided an image display method comprising a step of simultaneously displaying a plurality of images on a screen while overlapping at least two images with each other, the method comprising steps of: detecting face areas of the at least two images, respectively; and determining which of the at least two images is arranged at an upper position when overlapping the at least two images based on magnitudes of the respective face areas.

According to still another aspect of the present invention, there is provided an image display method comprising a step of simultaneously displaying a plurality of images on a screen while overlapping at least two images with each other, the method comprising steps of: detecting face areas of the at least two images, respectively; and determining both of or one of an exposure amount and an exposure position of the other one of the at least two images, which has a hidden part and an exposed part as a result of overlapping one of the at least two images with the other image, based on positions of the respective face areas.

According to the image display apparatus and the image display method of the present invention, if a plurality of images are displayed as a list while overlapping them with one another, parts considered to be regions of interest of the respective images are detected, thereby controlling image display so as not to overlap the regions of interest with one another. As a result, all the regions of interest of the images can be always exposed, whereby the constitution capable of realizing both improved user image search performance and display of a large quantity of images can be provided.

If a plurality of images are displayed as a list while overlapping them with one another, the images are controlled to be sequentially superposed in a descending order of magnitudes of the regions of interest of the images. As a result, by displaying a large quantity of digital images photographed by a user using a digital camera on the monitor screen while overlapping them with one another, the images can be efficiently arranged as the list thereon with a high exposure ratio of each region of interest. In addition, even if the images are arranged efficiently, the images are displayed so as not to overlap important parts for user's discrimination of photographs with one another, based on information characteristic of the individual images.

Namely, according to the present invention, the user can easily find a desired photograph.

Furthermore, if a plurality of images are displayed as the list while overlapping them with one another, the parts considered to the regions of interest of the respective images are detected, thereby controlling image display so as not to overlap the regions of interest with one another. As a result, all the regions of interest of the images can be always exposed, whereby the constitution capable of realizing both improved user image search performance and display of a large quantity of images can be provided.

Moreover, if a plurality of images are displayed as the list while overlapping them with one another, the images are controlled to be sequentially superposed in a descending order of magnitudes of the regions of interest of the images. As a result, the images can be efficiently arranged as the list thereon with a high exposure ratio of each region of interest.

BRIEF DESCRIPTION OF THE DRAWINGS

FIG. 5 depicts contents of the information table employed for the overlap control exercised by the display control unit 110 according to the first embodiment;

FIGS. 6A and 6B depict functions of the overlap control according to the first embodiment;

FIGS. 8A to 8C depict types of an exposure control mask employed for overlap control exercised by the display control unit 110 according to the second embodiment;

FIGS. 10A to 10F depict operation examples of the overlap control according to the second embodiment;

FIGS. 15A and 15B depict examples of an image display on a liquid crystal monitor screen of a digital camera employed in the embodiments of the present invention;

FIGS. 16A and 16B depict a state of a liquid crystal monitor screen during photographing using a digital camera which is employed in the first and the second embodiment of the present invention and which can record a focal position;

DETAILED DESCRIPTION OF THE PREFERRED EMBODIMENTS

Embodiments of the present invention will be described hereinafter with reference to the drawings.

First Embodiment

Figure 1:
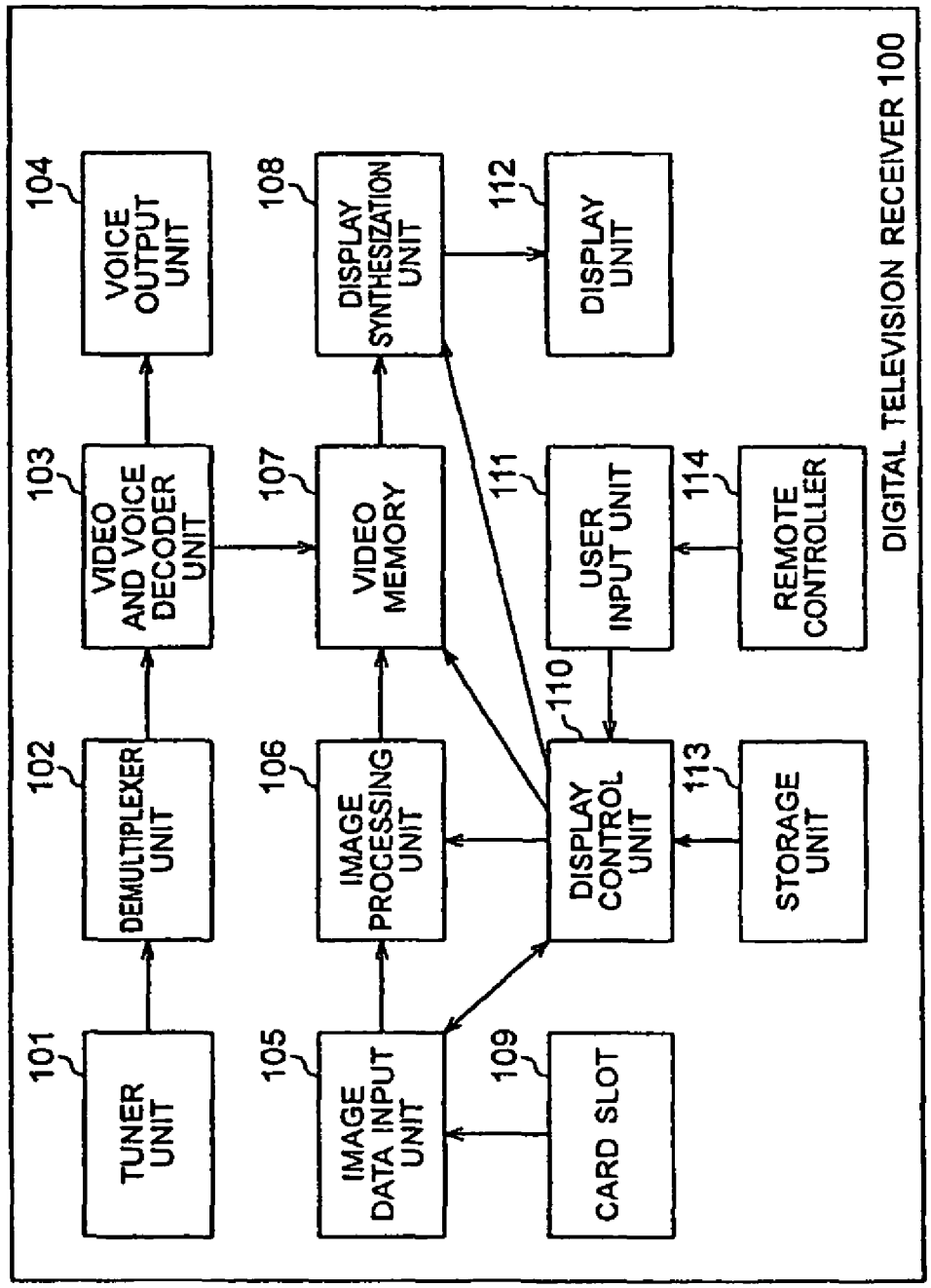
FIG. 1 is a block diagram which depicts configuration of a television receiver according to a first embodiment of the present invention.

A first embodiment of the present invention will be described. FIG. 1 depicts configuration of a digital television receiver 100 as an image display apparatus to which the present invention is applied.

In FIG. 1, a signal received at an antenna, not shown, is input to a tuner unit 101. The tuner unit 101 carries out processings such as demodulation and error correction to the input signal, and generates digital data in a format called "transport stream (TS)". The tuner unit 101 descrambles the generated TS data, and outputs the descrambled TS data to a demultiplexer unit 102.

The demultiplexer unit 102 fetches video data and voice data from the TS data in which video and voice data on a plurality of channels, electronic program guide ("EPG") data, digital broadcasting data and the like are time-division multiplexed, and which is input from the tuner unit 101, and outputs the fetched video data and voice data to a video and voice decoder unit 103. The video data processed by the video and voice decoder unit 103 is written into a video memory 107, and output to a display through a display synthesization unit 108. The voice data processed by the video and voice decoder unit 103 is output to a voice output unit 104.

In FIG. 1, reference symbol 109 denotes a card slot, to which a removable memory card or the like is connected. In the first embodiment, the card slot 109 is used to exchange data between a digital television receiver 100 and a digital camera. Reference symbol 105 denotes an image data input unit, which reads digital image data from the memory card or the like connected to the card slot 109. Reference symbol 106 denotes an image processing unit, which carries out an image processing to the digital image data input from the image data input unit 105, and which writes the resultant digital image data into the video memory 107.

Reference symbol 110 denotes a display control unit. The display control unit 110 instructs the image data input unit 105 to read the digital data image, the image processing unit 106 to execute the image processing, the video memory 107 to write the display image data, the display synthesization unit 108 to perform a synthesization processing, and a storage unit 113 to store information. The display control unit 110 also acquires input data from a remote controller 114 through a user input unit 111, and acquires photographic data allocated to the digital image data through the image data input unit 105. In this embodiment, the display control unit 110 corresponds to an overlap determination unit and an exposure determination unit.

Figure 2:
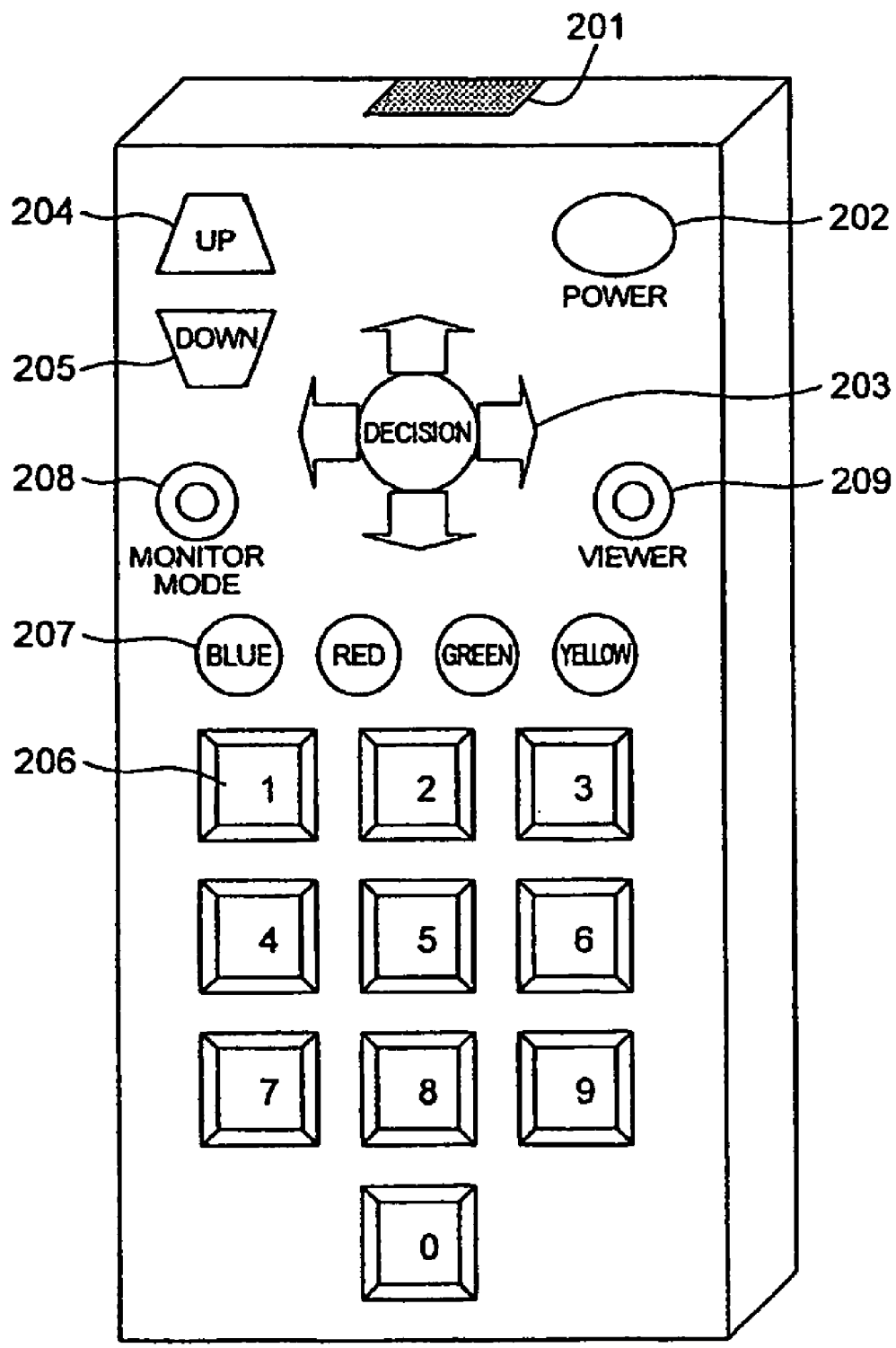
FIG. 2 is a block diagram of a remote controller of the television receiver according to the first embodiment.

FIG. 2 depicts one example of the remote controller 114. It is noted that FIG. 2 depicts only buttons for performing operations for realizing functions necessary to describe this embodiment. Therefore, buttons necessary for an actual receiver are not limited to those shown in FIG. 2.

In FIG. 2, reference symbol 201 denotes a light emitting unit for holding an infrared communication between the remote controller 114 and the user input unit 111, serving as a light receiving unit, shown in FIG. 1. Reference symbol 202 denotes a power key for turning on and off a power, and 203 denote a cursor and decision key having a decision button arranged in the middle of upper, lower, left, and right buttons. Reference symbols 204 and 205 denote an up and down key composed of two buttons, i.e., an Up button and a Down button, 206 denotes a numeric key having numeric buttons 1 to 9 and 0 arranged in a matrix, and 207 denotes a color key having four color buttons of blue, red, green, and yellow aligned.

Further, reference symbol 208 denotes a monitor mode key for switching over a display mode of a monitor of the television receiver, and 209 denotes a "viewer" key for calling an image viewer function.

The digital image used in this embodiment is still image data or moving image data photographed by the digital camera. As the still image data, data subjected to a JPEG compression processing by the digital camera, and recorded in the memory card as a still image data file is used. Likewise, as the moving image data, data subjected to the JPEG compression processing for each frame to provide images, and recorded in the memory card as a moving image data file is used. It is assumed that the "image file" denotes either the still image data or the moving image data in the description given hereafter.

Each image file is allocated information during photographing using the digital camera as information associated with the image. Examples of the allocated information during photographing include photographic scene mode information, focal position information that indicates a focal position in a finder, strobe light emission state information, information that indicates a distance between the camera and a subject, and zoom state information as well as a photographic date and a camera type.

For the digital camera employed in this embodiment, one of "left", "middle", and "right" is recorded as the focal position information in the finder during photographing.

FIGS. 15A and 15B depict examples of image display on a liquid crystal monitor screen of the digital camera employed in this embodiment. FIG. 15A depicts a state before a user touches a shutter button, and FIG. 15B depicts a state, after the user lightly touches the shutter button, in which the digital camera brings a rectangular region on the left into focus.

(Processing Operations)

In the digital television receiver 100 according to this embodiment, display of a list of digital images is initiated when the user inserts the memory card into the card slot 109, and calls the image viewer function by operation of the remote controller 114.

Figure 3:
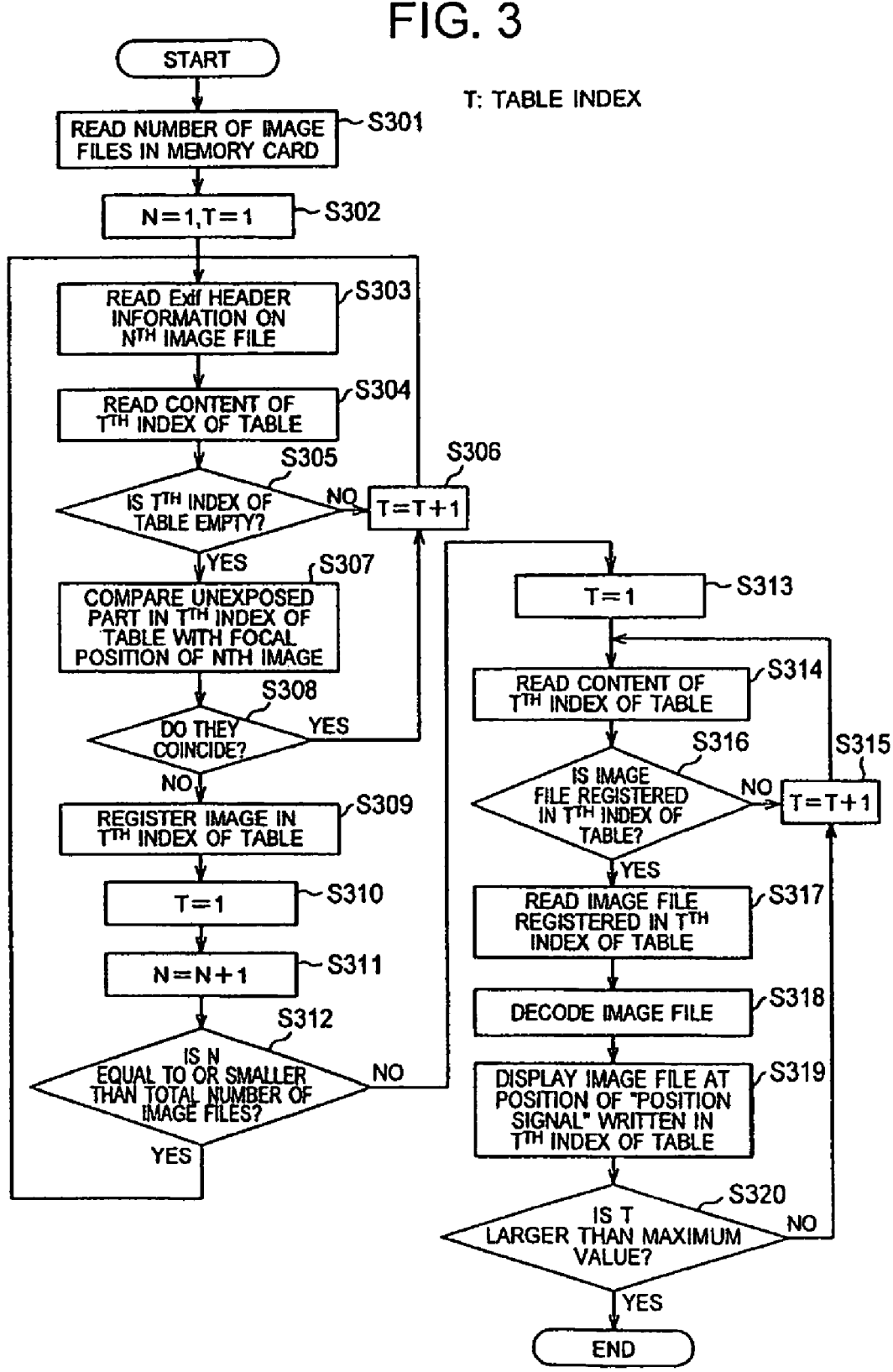
FIG. 3 is a flowchart which depict an operation flow of a display control unit 110 according to the first embodiment.
Figure 4:
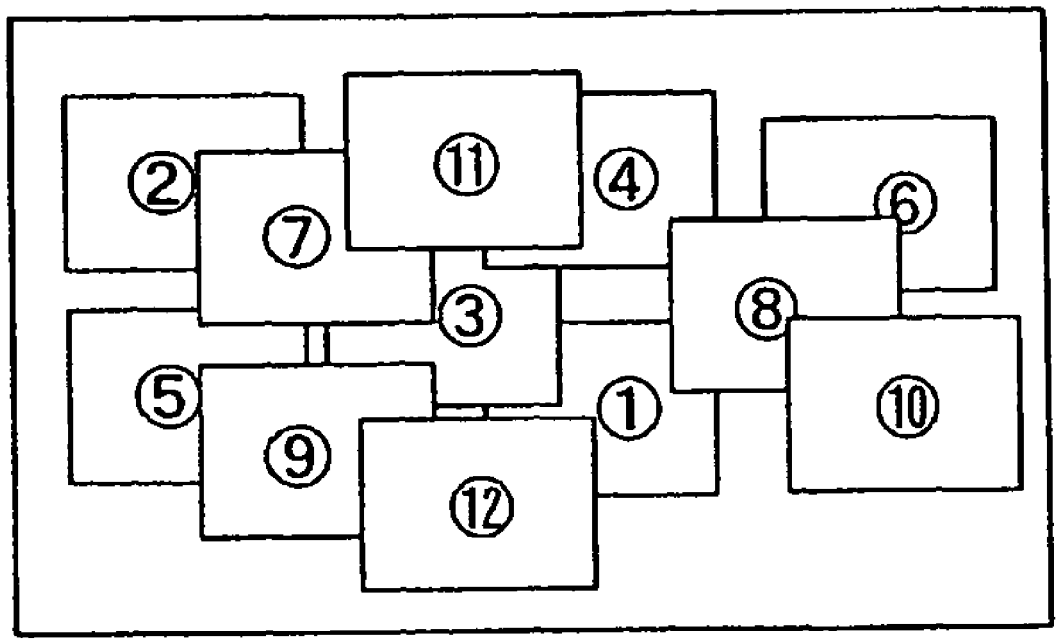
FIG. 4 depicts layout information included in an information table employed for overlap control exercised by the display control unit 110 according to the first embodiment.

FIG. 3 is a flowchart which depicts part of operations of the image viewer function in the digital television receiver 100 centering around operations performed by the display control unit 110. FIG. 5 depicts table data used when the display control unit 110 exercises layout control for the display of the image data list. FIG. 4 depicts one example of image display positions corresponding to respective indexes in FIG. 5. The processing operations of the display control unit 110 will be described with reference to FIGS. 3 to 5.

When the user depresses the "viewer" key 209 on the remote controller 114 shown in FIG. 2, the display control unit 110 starts processings shown in FIG. 3.

First, the display control unit 110 reads and stores the total number of all image files stored in the memory card inserted into the card slot 109 through the image data input unit 105 (in a step S301). The display control unit 110 reads Exif header information on a first image file (in steps S302 and S303).

The display control unit 110 reads a content of a first index of the table shown in FIG. 5 (in a step S304). If no image file is registered in the first index ("Yes" in a step S305), the display control unit 110 compares focal position information included in the read Exif header information with "an unexposed part" in the first index of the table (in a step S307). If they coincide ("Yes" in a step S308), the display control unit 110 reads a content of a second index of the table (in steps S306 and 304). If no image file is registered in the second index ("Yes" in the step S305), the display control unit 110 compares the focal position information included in the read Exif header information with "an unexposed part" in the second index of the table (in the step S307). If they do not coincide ("No" in the step S308), the display control unit 110 registers the first image file which is now being processed in this index of the table (in a step S309).

In FIG. 5, an image file named "IMG001.JPG" having the focal position information of "left" is not registered in the first index since the unexposed part of the first index is "left", which is equal to the focal position information of IMG001.JPG. The image file IMG001.JPG is registered in the second index of the table since the unexposed part in the second index is right, which differs from the focal position information "left" on the image file IMG001.JPG.

In this way, the display control unit 110 searches for an empty position in an ascending order of index of the table. If the display control unit 110 finds an empty position, the display control unit 110 compares the unexposed part corresponding to the index with the focal position information on the image file. If they coincide, the display control unit 110 carries out the same processing to the next index of the table.

Likewise, the display control unit 110 continues to carry out processings to second, third, and the following image files stored in the memory card. When completing with the processing to an $M^{th}$ image file (where M is the total number of image files), the display control unit 110 carries out a display processing to each image file according to contents registered in the tables. The display control unit 110 reads data on each of the image files from the memory card through the image input unit 105 (in a step S314), feeds the read data to the image processing unit 106 (in a step S318). The image processing unit 106 decodes the data (in a step S318) and writes the display data into the video memory 107, whereby the image is displayed (in a step S319).

If all the image files are displayed by the processings shown in FIG. 3, then the user operates the upper, lower, left, and right buttons of the cursor and decision key 203 on the remote controller 114, moves a cursor, and selects a desired image file. If the user depresses the decision button while the cursor is pointing out the desired image file, only the selected image file can be displayed on the monitor screen. It is noted that these processings are not shown in the figures.

(Functions and Advantages)

Figures 13A, 13B, 13C:
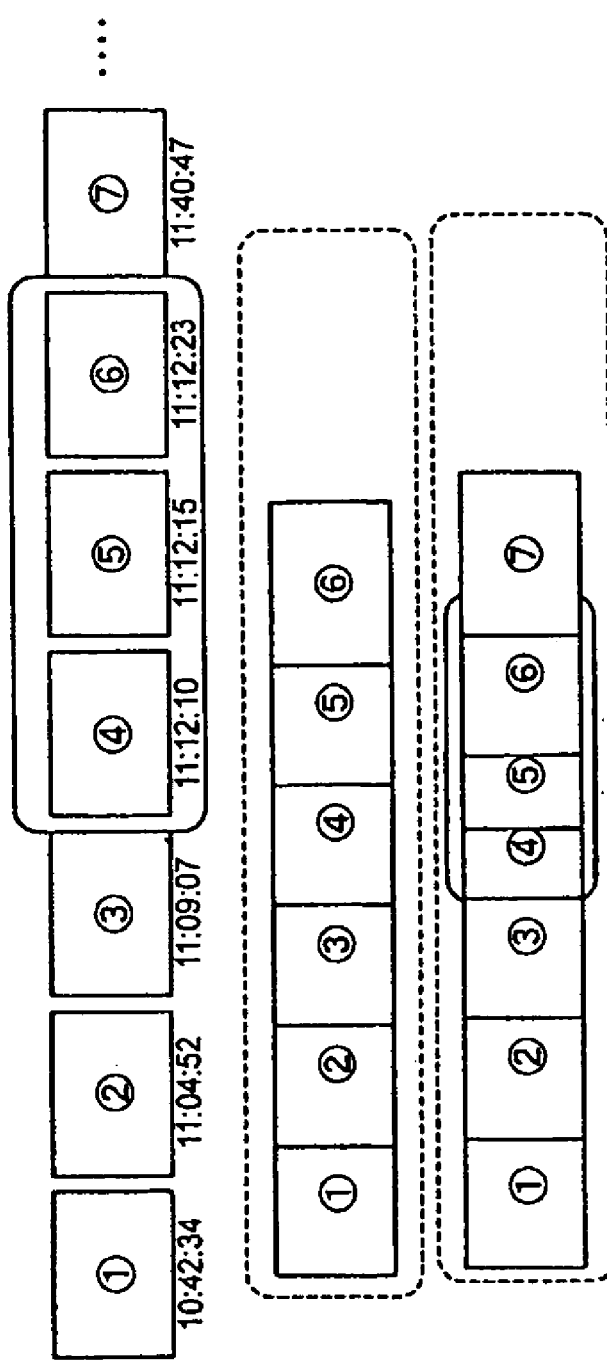
FIGS. 13A to 13C depict operation examples of overlap control according to the third embodiment.
Figure 14A:
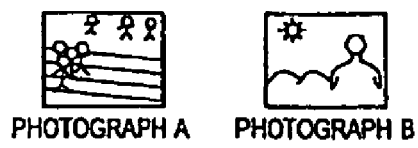
FIGS. 14A and 14B depict a display example of an image list without using the present invention and that using the present invention, respectively.
Figure 14B:
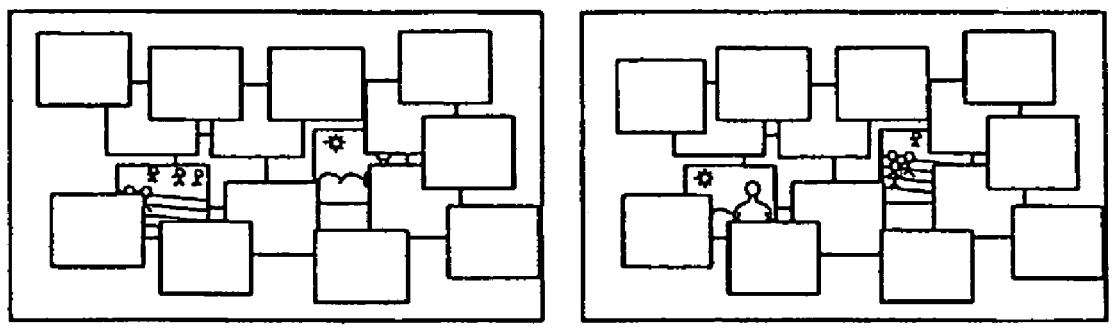

Functions obtained as a result of the processings performed by the display control unit 110 described above will be described. FIG. 6A depicts a state in which the image file IMG001.jpg having the focal position information of "left" is arranged by the processings above not at the position "1" at the position "2" (note that encircled numbers in FIGS. 4, 5, 6A and 6B, 10A to 10F, 11A to 11F, and 13A to 13C are replaced by bracketed numbers). As a result, the subject part (region of interest) on the left of this image file is exposed. As compared with an instance of arranging the image file IMG001.jpg at the position "1" as shown in FIG. 14B, the user can easily find this photographic image file.

Namely, according to the first embodiment of the present invention, based on the information characteristic of each photograph, a part suited for determination of the photograph can be exposed. In this embodiment, the focal position information recorded during photographing is used for the determination. Alternatively, if the digital camera can set a mode, in which the subject position or the focal position is fixed, as the photographic scene mode, information on this photographic scene mode can be used. If the digital camera having photographic scene modes of, for example, "person on the right" and "person on the left" as shown in FIG. 16 is used to photograph an image, and Exif header information on this image file includes information of "person on the right", then the position of the image file displayed in the image file list is controlled so as to expose a right part of the image. Thus, the functions stated above can be attained.

In the first embodiment, the instance of displaying only 12 photographic image files once on the monitor screen has been described for brevity of description. The number of image files which can be displayed once on the monitor screen may be set larger than 12.

Second Embodiment

A second embodiment of the present invention will be described. Since a digital television receiver employed in this embodiment is equal in configuration to that shown in FIG. 1, it will not be described herein.

In the second embodiment, digital image files photographed using a digital camera similar to employed in the first embodiment is used. Differently from the first embodiment, however, the digital camera which particularly records information on a photographic date, information as to a direction of the camera during photographing (that is, information that indicates a landscape photograph or a portrait photograph), and a mode setting of "auto mode", "landscape mode", "portrait mode", or "night mode" as a photographic scene mode during photographing. In this embodiment, information on the setting of the photographic scene mode corresponds to information on the photographic mode.

(Processing Operations)

In the digital television receiver 100 according to this embodiment, display of a list of digital image files is initiated when the user inserts the memory card into the card slot 109, and calls the image viewer function by operation of the remote controller 114.

Figure 7:
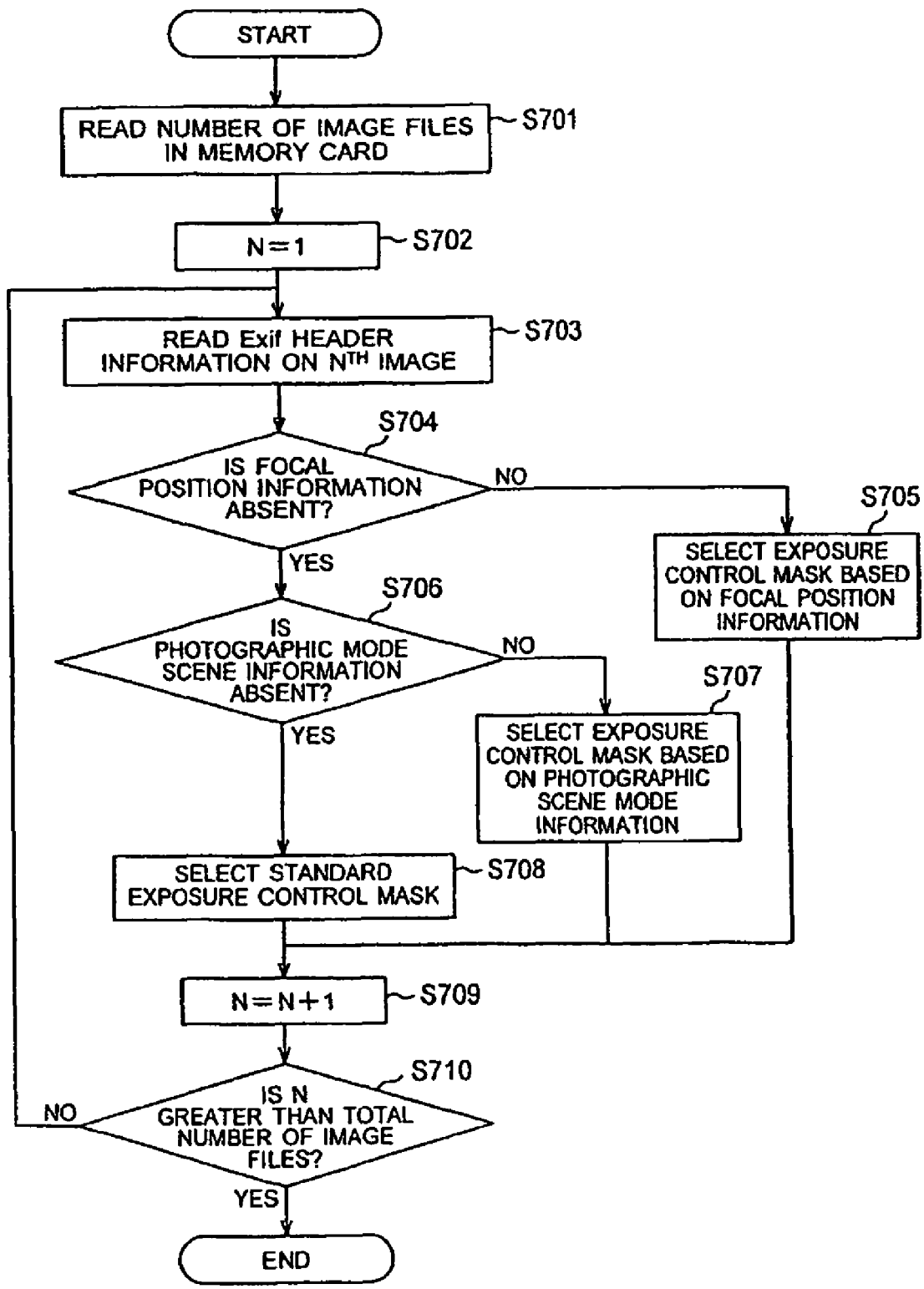
FIG. 7 is a flow chart which depicts an operation flow of a display control unit 110 according to a second embodiment of the present invention.

FIG. 7 is a flowchart which depicts part of operations of the image viewer function in the digital television receiver 100 centering around operations performed by the display control unit 110. FIGS. 8A to 8C depict types of an exposure control mask employed for processings shown in FIG. 7. Exposure control masks different in exposure amount and exposure position are prepared according to focal positions or photographic scene modes. The processing operations of the display control unit 110 will be described with reference to FIGS. 7 and 8A to 8C.

The display control unit 110 acquires the total number of image files recorded in the memory card (in a step S701), and reads Exif header information on a first image file (in a step S702).

If focal position information is included in the Exif header information on the first image data ("No" in a step S704), the display control unit 110 selects an exposure control mask having a focal position corresponding to the focal position information from among three masks shown in FIG. 8A, i.e., a left exposure mask, a center exposure mask, and a right exposure mask (in a step S705). If no focal position information is included in the Exif header information on the image file ("Yes" in the step S704) but photographic scene mode information is included therein ("No" in a step S706), the display control unit 110 selects an exposure control mask corresponding to the photographic scene mode from among those shown in FIG. 8B (in a step S707). If neither the focal position information nor the photographic scene mode information are included in the Exif header information on the image file, the display control unit 110 selects a standard exposure mask shown in FIG. 8C (in a step S708).

For subsequent image files, the display control unit 110 carries out the same processings to determine the exposure control masks for the respective image data (in steps S709, S710, S703, and the following).

Figure 9:
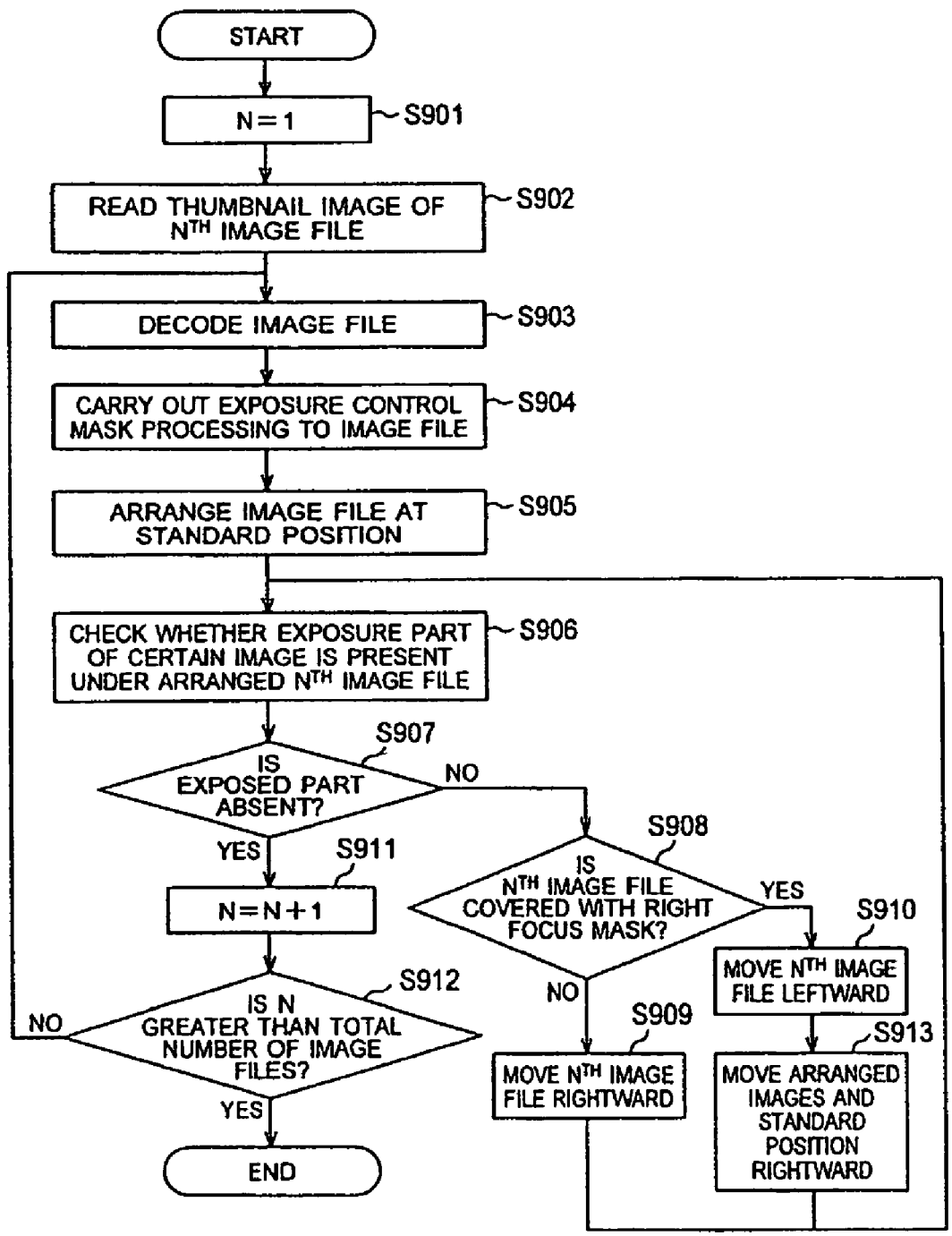
FIG. 9 is a flow chart which depicts an operation flow of the display control unit 110 according to the second embodiment.

FIG. 9 is a flow chart which depicts a processing flow for a display processing performed by the display control unit 110. FIGS. 10A to 10F depict the image data used in this embodiment and states of the image files on the monitor screen under the display control shown in FIG. 9. FIG. 10A depicts the image file used in this embodiment. In FIGS. 10A to 10F, the image files used herein and denoted by "1" to "10" alternately having focal position information of "left", "center", and "right" are arranged in this order.

The display processing will be described with reference to FIG. 9 and FIGS. 10A to 10F.

The display control unit 110 reads a thumbnail image of the first image file from the memory card (in steps S901 and S902). The image processing unit 106 decodes the thumbnail image (in a step S903), and carries out a mask processing to the decoded image file using the exposure control mask selected in the processing shown in FIG. 7 (in a step S904). As this mask processing, a processing for burying flag data that indicates whether each pixel data is an exposed part or an unexposed part is carried out.

In this embodiment, a lower one bit of a blue component pixel (0 to 255 bits) is used as the flag data. That is, a blue component pixel having the lower one bit of "0" means the unexposed part, and a blue component pixel having the lower one bit of "1" means the exposed part.

Next, the display control unit 110 arranges the first image file which is now being processed at a preset standard position on the monitor screen (in a step S905). In this embodiment, the reference location is set at a left end of a region which is to be displayed as the list on the monitor screen. The display control unit 110 determines whether the pixel including the flag data that indicates the exposed part is present under the region in which the image file is to be arranged (in a step S906). Since no other image file is present for the first image file, the first image file is arranged at the standard position as it is.

If the flag data that indicates an exposed position is present under the first image file already arranged, that is, if the second image file is overlapped with the exposed part of the other image file while the display control unit 110 processes the second file similarly to the first image file (in steps S907 and S908), the display control unit 110 moves a position of the arranged second image file in a right direction by as much as certain number of pixels, and thereby rearranges the second image file (in a step S909).

FIG. 10B depicts a state in which the display processing up to the second image file is finished. Specifically, the second image file is initially arranged at the standard position by the arrangement processing. However, since the second image file is overlapped with the exposed part of the first image file, the position of the second image file is moved in the right direction. When there is no overlap of the second image file with the exposed part of the first image file, the arrangement processing is finished.

The third image file is then processed. During this processing, the third image file is initially arranged at the standard position, and overlapped with the exposed part of the first image file. A position of the third image file is moved, and the third image file is thereby rearranged. As can be seen from FIG. 10A, however, the third image file is a photograph having the focal position information of "right" in this embodiment. Therefore, for the third image file, the display control unit 110 selects the right exposure mask in the processing shown in FIG. 7. In this case, therefore, the display control unit 110 moves the third image file in a left direction relative to the standard position (in a step S910) to a position at which the third image file is not overlapped with the exposed part of the other image file, and thereby rearranges the third image file. At this time, the display control unit 110 slides the already arranged image files (the first and the second image files in this embodiment) rightward so that the third image file does not protrude from the list display region surrounded by a dotted line. In addition, the display control unit 110 moves the standard position rightward by as much as the same number of pixels as that for the first and the second image files (in a step S913). FIG. 10C depicts this state.

The fourth image file and the following are similarly processed, and the arrangement processing is proceeded as shown in FIGS. 10D to 10F.

(Functions and Advantages)

Figure 11A:
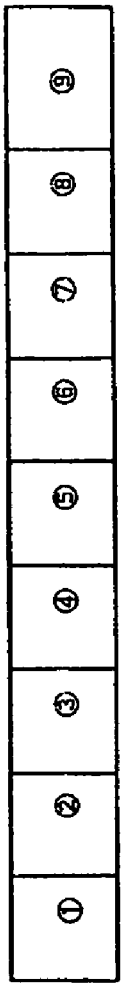
FIGS. 11A to 11F depict functions of the overlap control in an example of overlap display without using the present invention and those according to the second embodiment of the present invention.
Figure 11B:
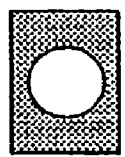
Figure 11C:
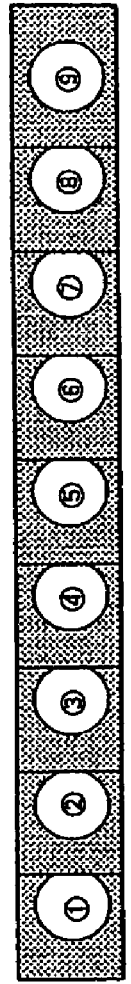
Figure 11D:
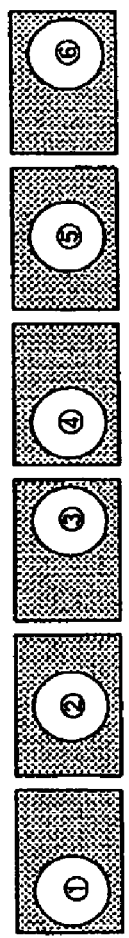
Figure 11E:
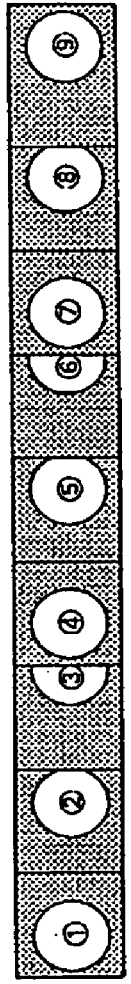
Figure 11F:
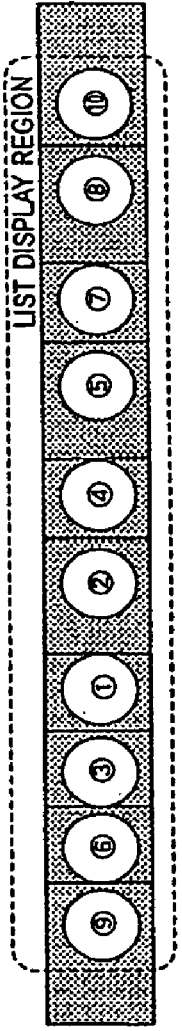

Functions obtained as a result of the processings performed by the display control unit 110 described above will be described. Before starting the description, examples of display to which the present invention is not applied will be described with reference to FIGS. 11A to 11F. FIG. 11A depicts a display example of displaying the image files with the image files simply overlapped with one another without applying the present invention. In the example of FIG. 11A, if focal positions of all the image files are at the center of the respective image files as shown in FIG. 11B, substantially all of the focal positions are exposed as shown in FIG. 11C. However, as shown in FIG. 11D, if image files including the image files the focal positions of which are not at the center are displayed as the list, exposed parts of some of the image files are greatly hidden as shown in FIG. 11E.

If the user is to photograph images having a plurality of focal positions using the digital camera as employed in this embodiment, the user normally performs photographing while confirming that the camera brings a part that the user considers important into focus. That is, if an image file is displayed with a region near its focal positions hidden, this often means that the subject which the user considers important, i.e., the important part for determination of the image file is hidden.

If the display control unit 110 according to this embodiment performs the display processings as stated above, by contrast, all image files can be displayed without causing regions near their respective focal positions to be hidden.

Furthermore, although not shown in FIGS. 11A to 11F, even if no focal position information is present for an image file, the exposed part and the exposed amount can be controlled according to the photographic scene mode of the image file by switching the exposure control mask in the photographic scene mode such as "landscape mode" or "portrait mode" in the exposure control mask selection processing described above with reference to FIGS. 7 and 8A to 8C. For example, if the image file is a landscape photograph, the entire landscape often remains as "impression" for the user. Due to this, in order to discriminate and select the image file, it is necessary to increase the exposed part of the image file. If the image file is a portrait photograph, then it often suffices to expose the image file so as to discriminate a face, and it is unnecessary to increase the exposed part of the image file.

By thus exercising control while reflecting the photographic scene mode of each image file in the control, it is possible to efficiently arrange the image files in accordance with characteristics of the respective image files while maintaining easiness of discrimination.

In the second embodiment, only an instance of arranging the image files laterally to be aligned while overlapping the image files has been described as a method for displaying a list of images. However, in light of the concept of the present invention, it is natural that the image display method is not limited to that described in this embodiment. The present invention can be also applied to an instance of displaying the image files longitudinally and an instance of displaying the image files both laterally and longitudinally.

In this embodiment, the use of the lower one bit of the blue component pixel as the flag data in the mask processing using the exposure control mask has been described. However, in light of the concept of the present invention, it is natural that the flag data is not limited to that described in this embodiment. The present invention can be also applied to an instance of providing a dedicated flag bit for each pixel and an instance of using bits of data that indicate an alpha blending ratio.

In this embodiment, only the two types of photographic scene modes of "portrait mode" and "landscape mode" have been taken as an example. Needless to say, the photographic scene modes according to the present invention are not limited to them. "Night scene mode" and "macro scene mode" may be similarly available.

Third Embodiment

In the second embodiment, the image files are arranged so as to be efficient and easy to discriminate based on the Exif header information such as the focal position information and the photographic scene mode information. In light of the gist of the present invention, the Exif information used for the arrangement is not limited to these pieces of information. The image files can be efficiently arranged based on, for example, the photographic date information.

Since a digital television receiver employed in this embodiment is equal in configuration to that shown in FIG. 1, it will not be described herein.

(Processing Operations)

Figure 12:
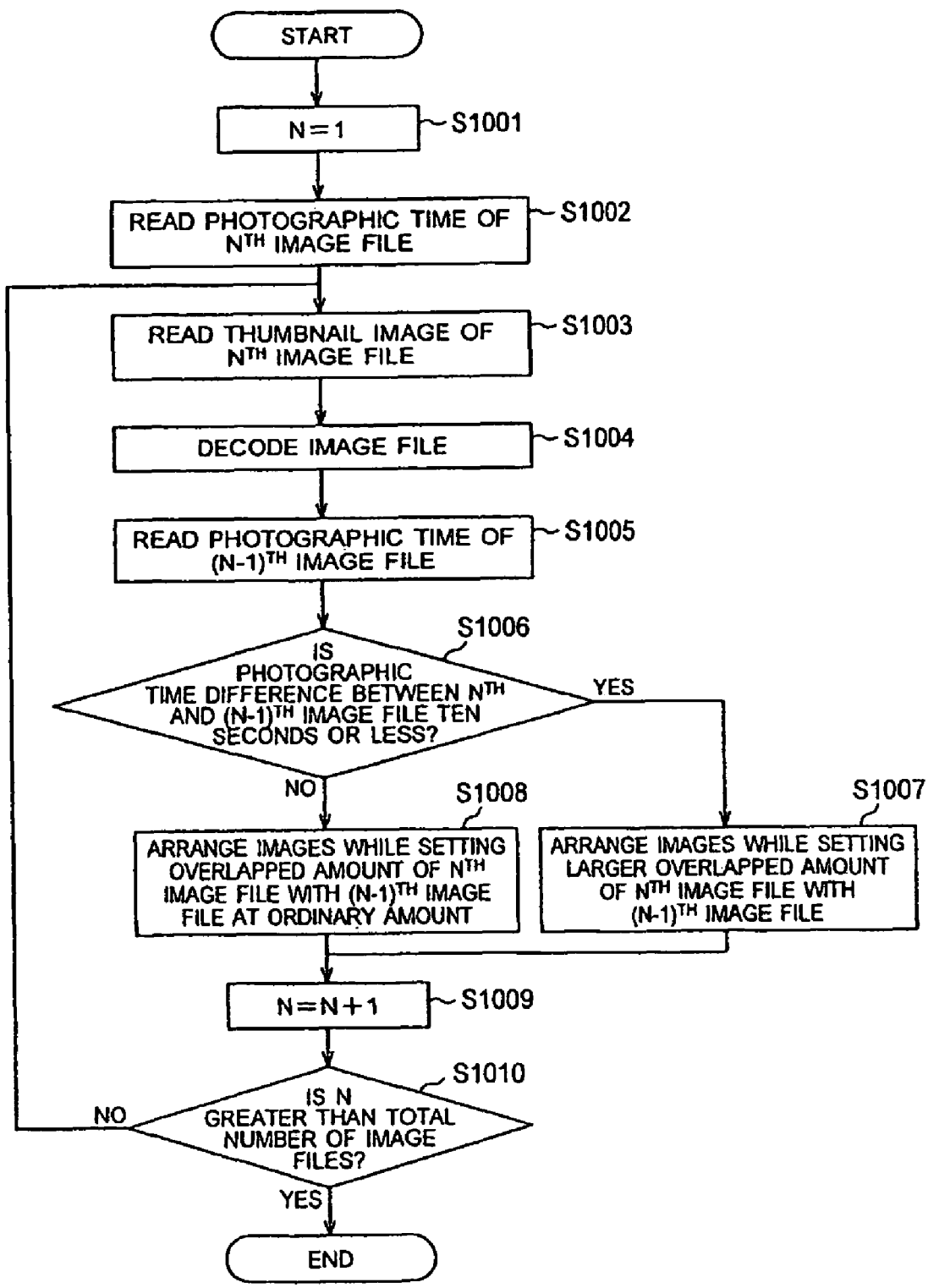
FIG. 12 is a flow chart which depicts an operation flow of a display control unit 110 according to a third embodiment of the present invention.

FIG. 12 is a flowchart which depicts part of operations of the image viewer function in the digital television receiver 100 centering around operations performed by the display control unit 110. FIGS. 13A to 13C depict image files used in this embodiment. Image files are arranged at time series, and photographic time is shown below each image file.

The display control unit 110 reads Exif header information on first image file from the memory card (in steps S1001 to S1002). The display control unit 110 further reads a thumbnail image of the first image file (in a step S1003). The display control unit 110 feeds the read image file to the image processing unit 106, and the image processing unit 106 decodes the image file (in a step S1004).

Next, the display control unit 110 reads a photographic time of $(N-1)^{th}$ image file (in a step S1005). If a difference in photographic time between the $N^{th}$ image file and the $(N-1)^{th}$ image file is within ten seconds (files at the positions of "5" or "6" in FIGS. 13A to 13C), then the display control unit 110 controls image display so as to set a larger overlapped amount between the $N^{th}$ image file and the $(N-1)^{th}$ image file (in steps S1006 and S1007). If the difference in photographic time between the $N^{th}$ image file and the $(N-1)^{th}$ image file exceeds ten seconds, the display control unit 110 controls the image display so as to set the overlapped amount therebetween at a predetermined ordinary amount (in steps S1006 and S1008).

Likewise, the same processings are carried out to $(N+1)^{th}$ image file and the following. When the processings are carried out to all image files recorded in the memory card, the processings are finished (in steps S1009 and S1010).

By thus controlling the image display, the image files are displayed as a list as shown in FIG. 13C.

(Functions and Advantages)

As compared with an instance in which all the image files are overlapped with one another with the same overlapped amount by the processings stated above (FIG. 13B), more image files can be arranged once on the monitor screen according to this embodiment. If the photographic time difference is as small as ten seconds or less, only one image file (file at the position "6" in FIG. 13C) among the image files is exposed more than the other image files (files at the positions "4" and "5" in FIG. 13C). Since the exposed parts are reduced, it is considered undesirable for discrimination of photographs. However, for the image files the photographic time difference among which is small as seen in this example, the user can estimate contents of the less exposed image files (files at the positions "4" and "5") from the more exposed image file (file at the position "6"). Normally, therefore, this is not a hindrance for image file selection.

In other words, the processings performed by the display control unit 110 according to this embodiment enables efficient display of a list of image files in accordance with the difference in photographic time among the image files.

Fourth Embodiment

Figure 17:
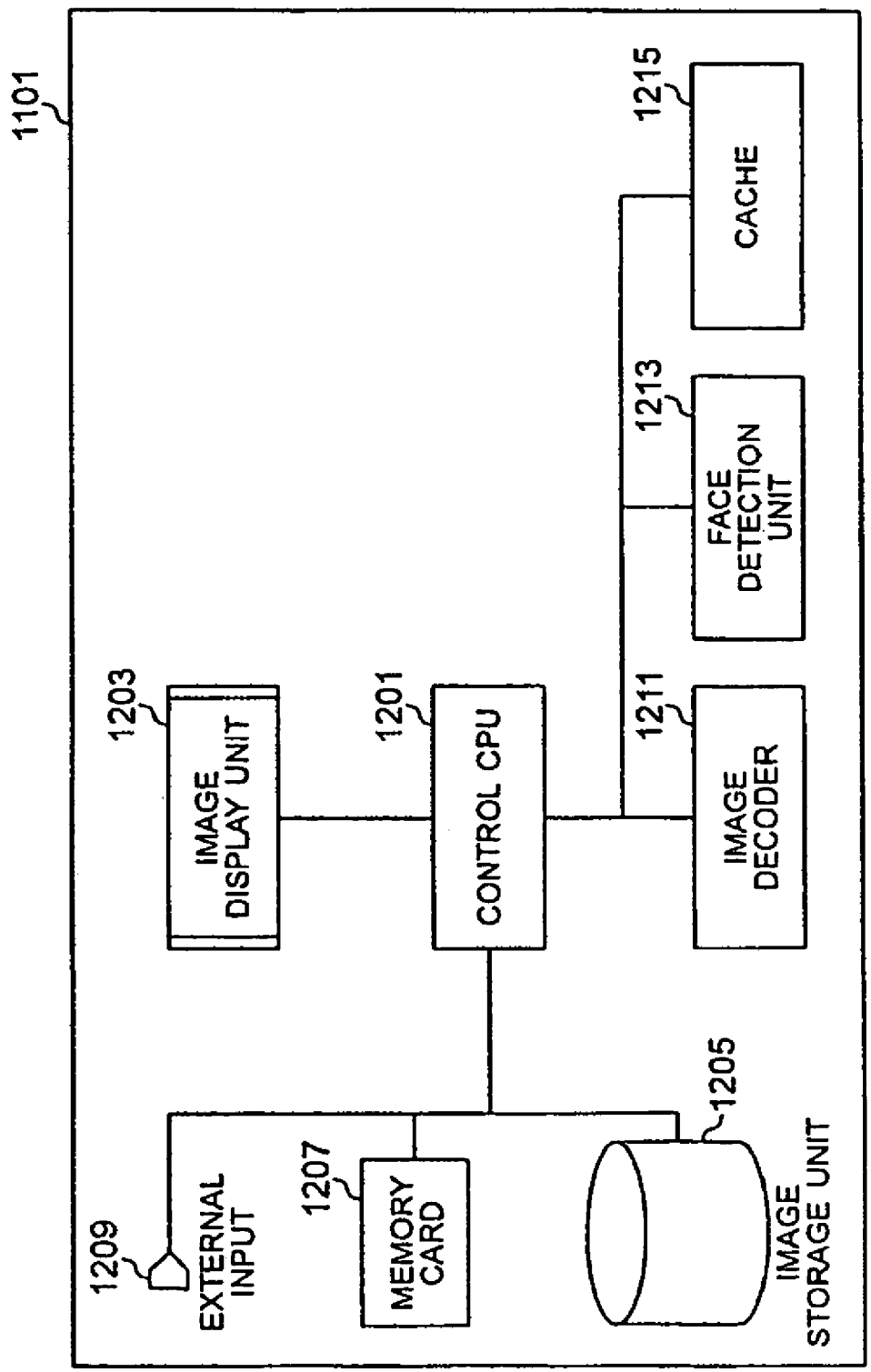
FIG. 17 is a block diagram which depicts configuration of an image display apparatus according to the embodiments of the present invention.

FIG. 17 is a block diagram which depicts configuration of an image display apparatus according to a fourth embodiment.

In FIG. 17, reference symbol 1101 denotes the image display apparatus. Reference symbol 1201 denotes a control CPU which controls entirety of the image display apparatus 1101. Reference symbol 1203 denotes an image display unit, which is composed of a device which can realize a thin film display such as a liquid crystal display or a plasma display. The image display unit 1203 displays an image file indicated by the control CPU 1201. In this embodiment, the control CPU 1201 corresponds to an overlap determination unit and an exposure determination unit, and the image display unit 1203 corresponds to a display.

The image display apparatus 1101 also display a list of a plurality of image files while overlapping them with one another, which is a feature of the present invention.

Reference symbol 1205 denotes an image storage unit, which is composed of a nonvolatile memory such as a hard disk. The image storage unit 1205 can accumulate and store a large quantity of images photographed by a digital camera or a digital video camera, and fetched by the image display apparatus 1101.

Reference symbol 1207 denotes a memory card. The memory card 1207 is detachable. The memory card 1207 can be also connected to an image photographing device such as the digital camera or the digital video camera. Photographed image files can be fetched into the image display apparatus 1101 via this memory card 1207.

Reference symbol 1209 denotes an external input terminal. Via this terminal 1209, the image files photographed by the image photographing device such as the digital camera or the digital video camera can be directly fetched into the image display apparatus 1101.

Reference symbol 1211 denotes an image decoder unit. A format of the image file stored in the image storage unit 1205 or the memory card 1207 or that fetched from the external input terminal 1209 is converted into a data format which can be handled by the constituent elements of the image display apparatus 1101 such as the control CPU 1201.

Reference symbol 1213 denotes a face detection processing unit. The face detection processing unit 1213 determines whether a person image is present in the fetched image file. If the person image is present, the face detection processing unit 1213 carries out a processing for specifying a region of the person image. Details of the processing will be described later.

Reference symbol 1215 denotes a cache memory. The cache memory 1215 is used to, for example, temporarily store the image file decoded by the image decoder unit 1211, to store the image file displayed by the image display unit 1203, and to temporarily store the image file for the face detection processing unit 1213.

Figure 18:
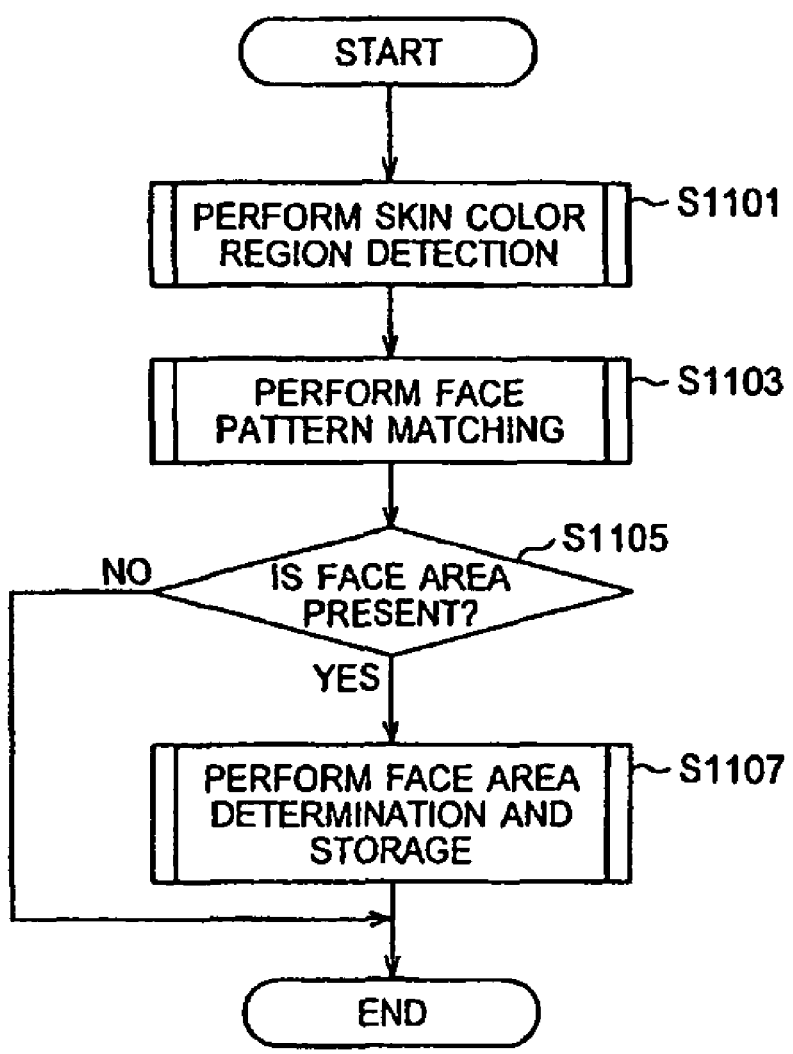
FIG. 18 is a flow chart which depicts a processing flow for a face detection processing used as one method for detecting a region of interest.

FIG. 18 is a flowchart which depicts a processing flow for a face detection processing used as one method for detecting a region of interest.

Before executing display of a list of image files while overlapping them with one another, the face detection processing unit 1213 executes the face detection processing to display target image files. When the processing starts, a step S1101 is executed.

In the step S1101, the face detection processing unit 1213 executes a processing for finding a region which includes skin color data from color data included in the image file. Thereafter, a step S1103 is executed.

In the step S1103, the face detection processing unit 1213 executes a pattern matching processing for determining whether the target image file matches to a pattern indicating features of a face, i.e., image patterns of eyes and mouth. Thereafter, a step S1105 is executed.

At the step S1105, based on processing results of the steps S1101 and S1103, i.e., based on whether a face area is present in the target image file, the processing is branched. Namely, if the face area is present, the processing goes to a step S1107. If the face area is not present, the processing is finished.

In the step S1107, the face detection processing unit 1213 writes information of the area determined as the face area by the processing results of the steps S1101 and S1103 into the cache memory 1215, and returns the processing to the control CPU 1201. The processing of the face detection processing unit 1213 is thereby finished.

Figure 19A:
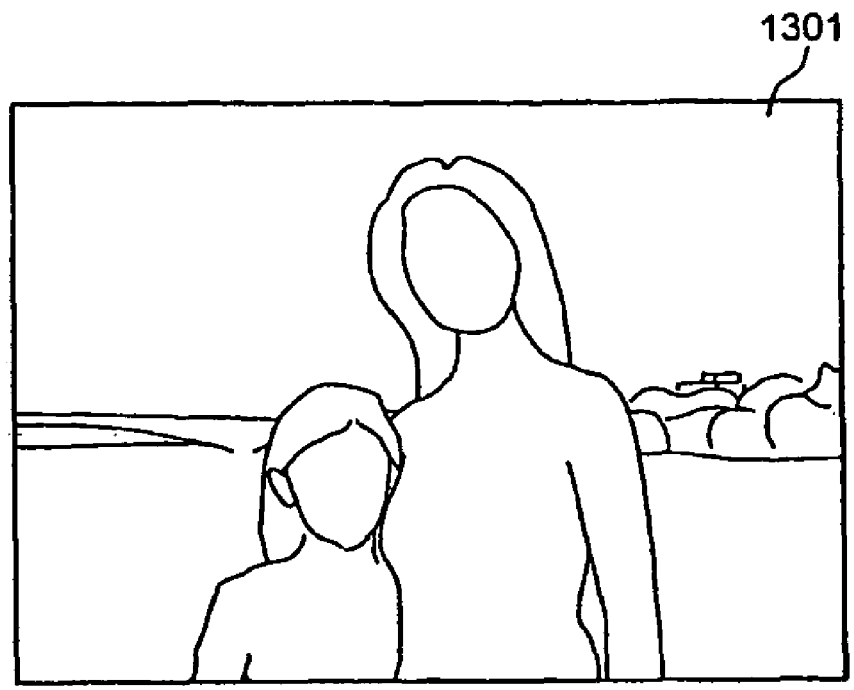
FIG. 19A depicts one example of image data.
Figure 19B:
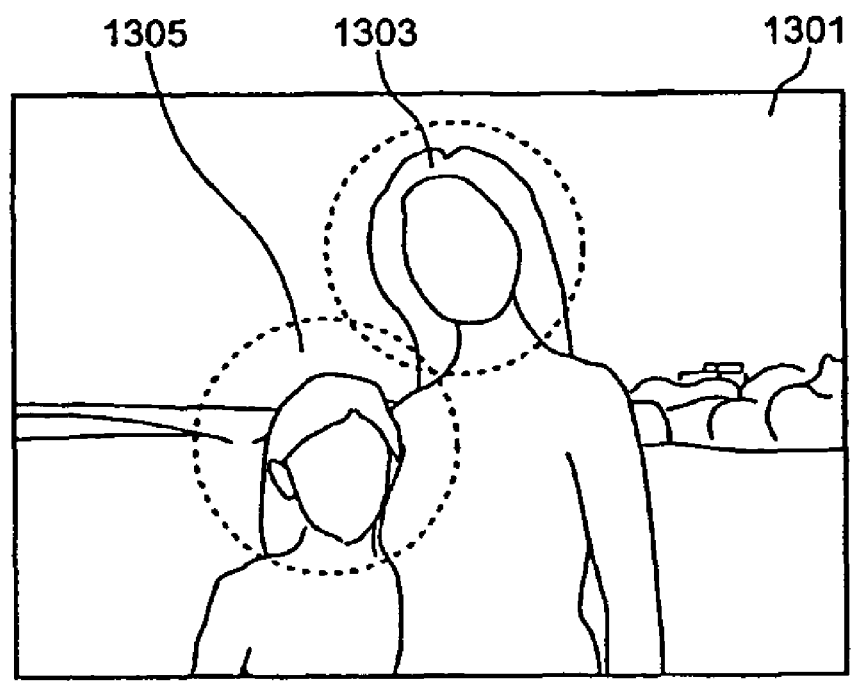
FIG. 19B depicts one example of a determination result of a face area after the face detection processing.

FIG. 19A depicts one example of the image file. FIG. 19B depicts one example of a region-of-interest determination processing based on a face area determination result of the face detection processing.

The image file in which person images are present as shown in FIG. 19A is subjected to the face detection processing by the face detection processing unit 1213 by the processing flow described with reference to FIG. 18. As shown in FIG. 19B, areas determined as face areas are portions indicated by 1303 and 1305. As shown in FIG. 19B, the face areas are recognized as circular graphic data.

The face areas detected by the face detection processing are determined as regions of interest and applied to control over display of list of image files while overlapping them with one another. objects to the entire image data is high, the face detection processing can be performed with high detection efficiency. If the occupying ratio is low, the face detection processing unit 1213 cannot often detect the face areas. A processing in this case will be described with reference to FIGS. 20A and 20B.

Figure 20A:
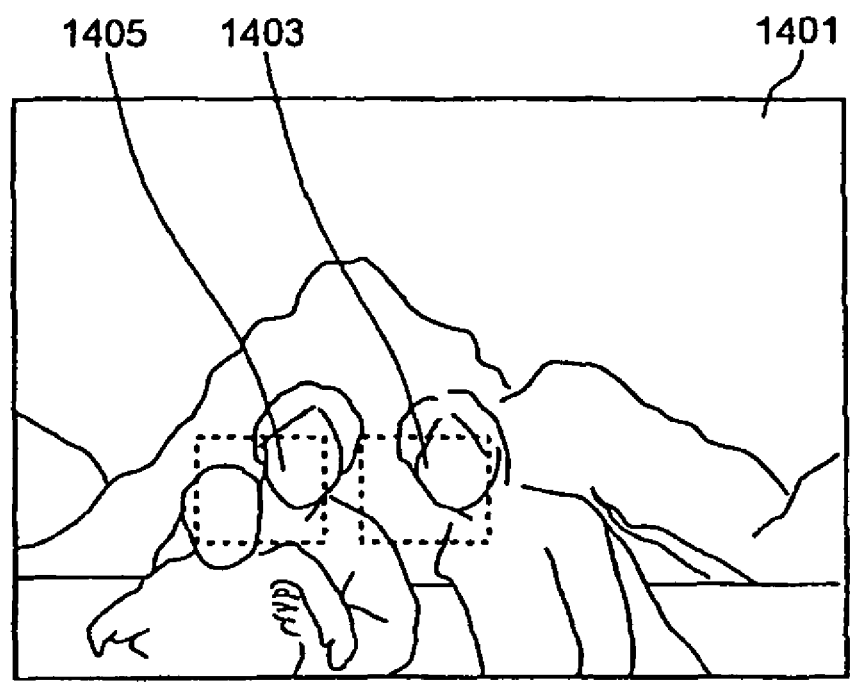
FIG. 20A depicts one example of image data.
Figure 20B:
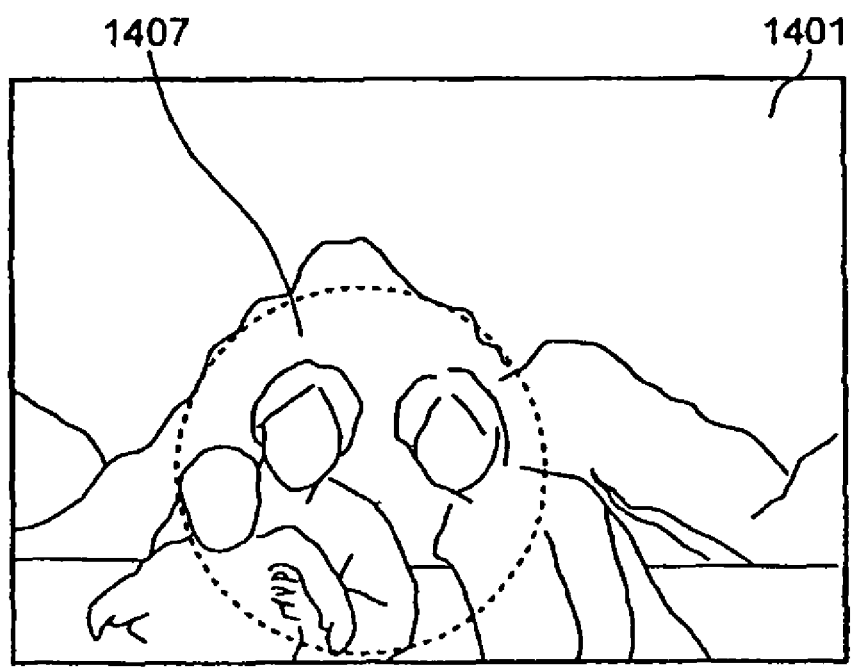
FIG. 20B depicts one example of a region-of-interest determination processing based on picture-taking information.

FIG. 20A depicts one example of the image data. FIG. 20B depicts one example of the region-of-interest determination processing based on picture-taking information.

The image file photographed by the digital camera or the like can hold information during photographing (Exif information) therein. This Exif information includes position information during photographing. According to this embodiment of the present invention, therefore, if the face detection processing fails, focal position information included in the Exif information is read. The focal position information corresponds to ranges indicated by reference symbols 1403 and 1405 in FIG. 20A.

Based on this focal position information, a range indicated by a circle and including the position information is recognized as the region of interest. The region of interest corresponds to a range indicated by reference symbol 1407 in FIG. 20B.

In this way, if the face areas cannot be detected from the target image file, the region of interest is determined based on the focal position information included in the Exif information.

Figure 21:
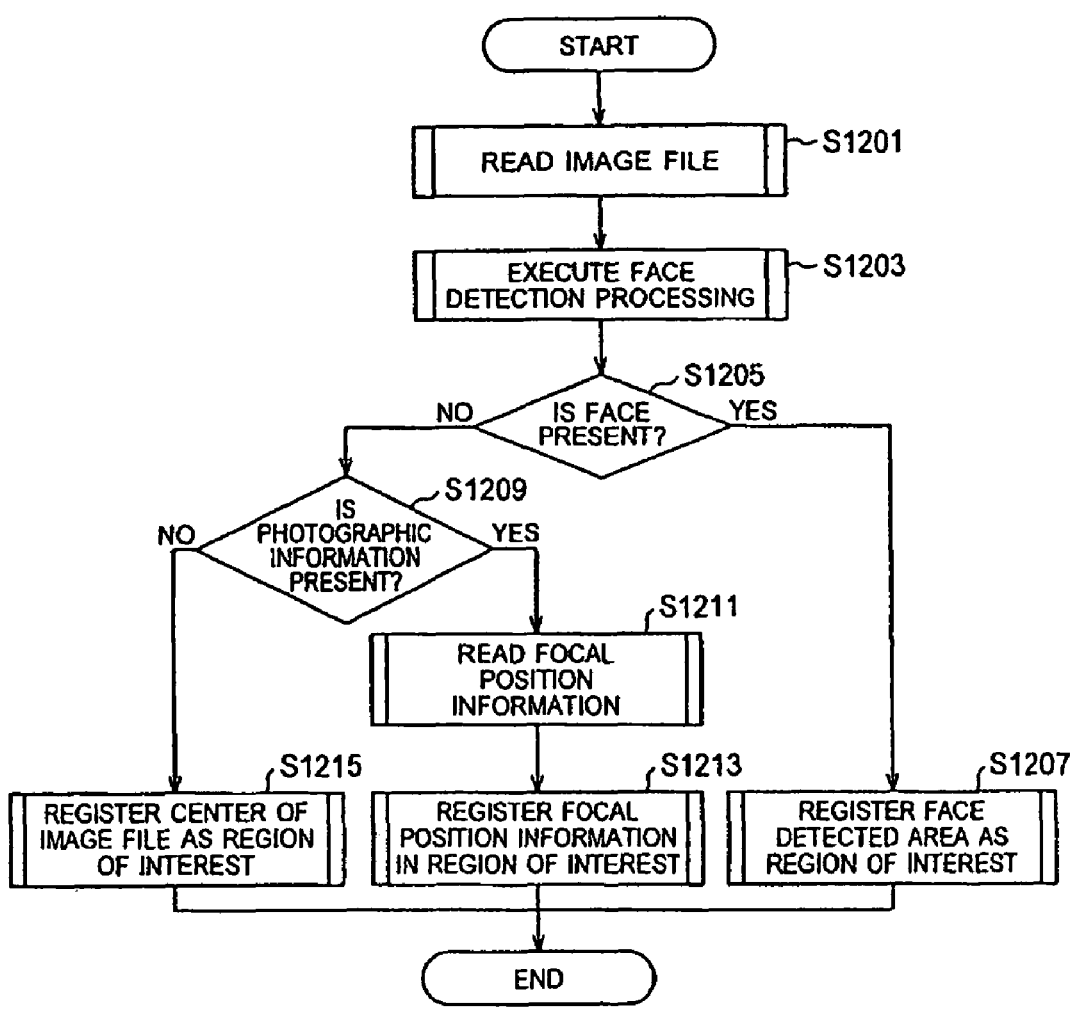
FIG. 21 is a flowchart which depicts a processing flow for a region-of-interest determination processing according to a fourth embodiment of the present invention.

FIG. 21 is a flowchart which depicts a processing flow for the region-of-interest determination processing.

This processing is executed before the control over display of a list of image files while overlapping the image files with one another. When the processing starts, a step S1201 is executed.

In the step S1201, the image files are read from the image storage unit 1205, the memory card 1207, and the external input terminal 1209, decoded by the image decoder unit 211, and stored in the cache memory 215. Thereafter, a step 1203 is executed.

In the step S1203, the face detection processing performed by the face detection processing unit 1213 described with reference to FIG. 18 is called for the read image files. Thereafter, a step S1205 is executed.

In the step S1205, the processing is branched depending on whether a face area is present based on the face detection processing result. If the face area is present, the processing goes to a step S1207. If no face area is present, the processing goes to a step S1209.

In the step S1207, face area data stored in the cache memory is registered as region-of-interest data on the target image file since it is determined that the face region is present in the target image file. After the registration, the processing is finished.

In the step S1209, the processing is branched depending on whether the Exif information is included in the target image file. If the Exif information is present, the processing goes to a step S1211. If the Exif information is not present, the processing goes to a step S1215.

In the step S1211, the Exif information is read from the target image file, and the focal position information is further read from the Exif information. Thereafter, a step S1213 is executed.

In the step S1213, a processing for converting the focal position information described with reference to FIGS. 20A and 20B into a focal position region is executed. This focal position region is registered as the region of interest. After the registration, this processing is finished.

In the step S1215, a central position of the image file is registered as the region of interest since no face area is present in the target image file and no Exif information can be acquired from the target image file. After the registration, the processing is finished.

The processing described above is executed to all image files to be displayed as a list while being overlapped with one another.

Figure 22A:
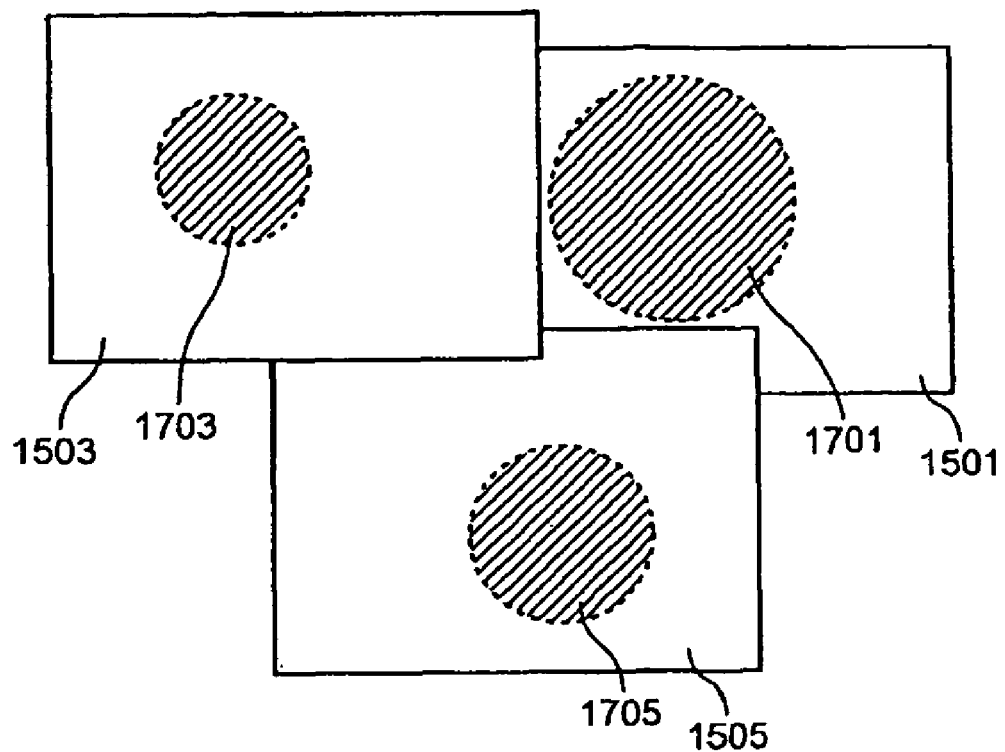
FIG. 22A depicts one example of displaying overlapped images at random.
Figure 22B:
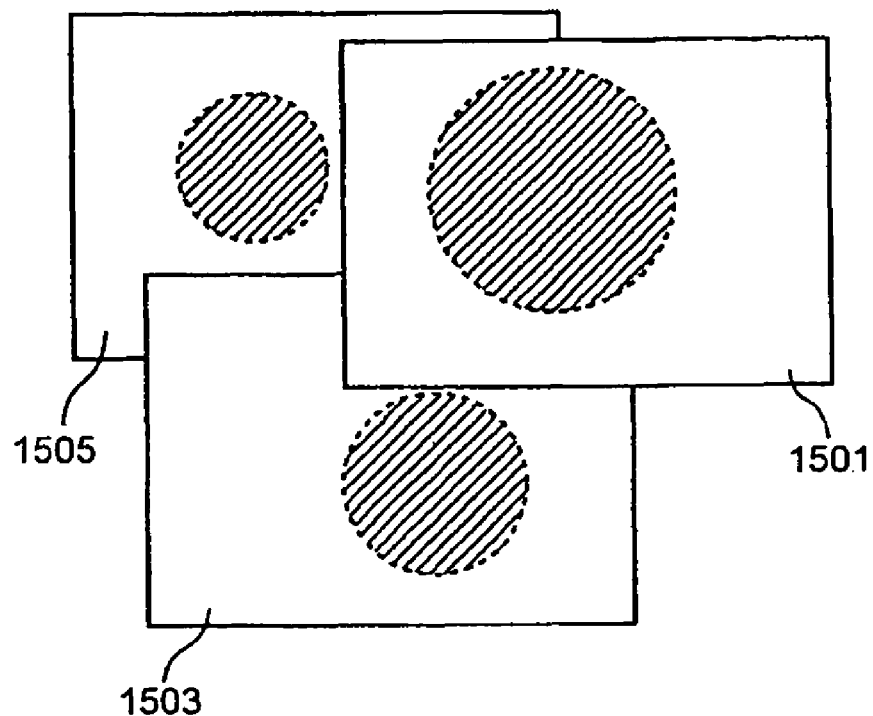
FIG. 22B depicts one example of displaying overlapped images while considering magnitudes of respective regions of interest.

FIG. 22A depicts one example in which image files are displayed while being overlapped with one another at random. FIG. 22B depicts one example in which image files are displayed while being overlapped with one another in consideration of magnitudes of regions of interest.

In display of a list of a plurality of image files while overlapping them with one another, regions of interest 1701, 1703, and 1705 of respective image files 1501, 1503, and 1505 are always displayed as protection regions on the monitor screen. This enables improving user search performance. Further, a region other than the region of interest of each image file is arranged, as a region of no interest, to be hidden by the other image file, thereby making it possible to efficiently display the image files.

As compared with the instance of displaying the image files while overlapping them with one another at random as shown in FIG. 22A, the monitor screen can be effectively used when the image files are displayed while being overlapped with one another so that the image file having a wider region of interest is put on the image files having smaller regions of interest as shown in FIG. 22B. By introducing this processing, it is possible to display the image files more efficiently.

Figure 23:
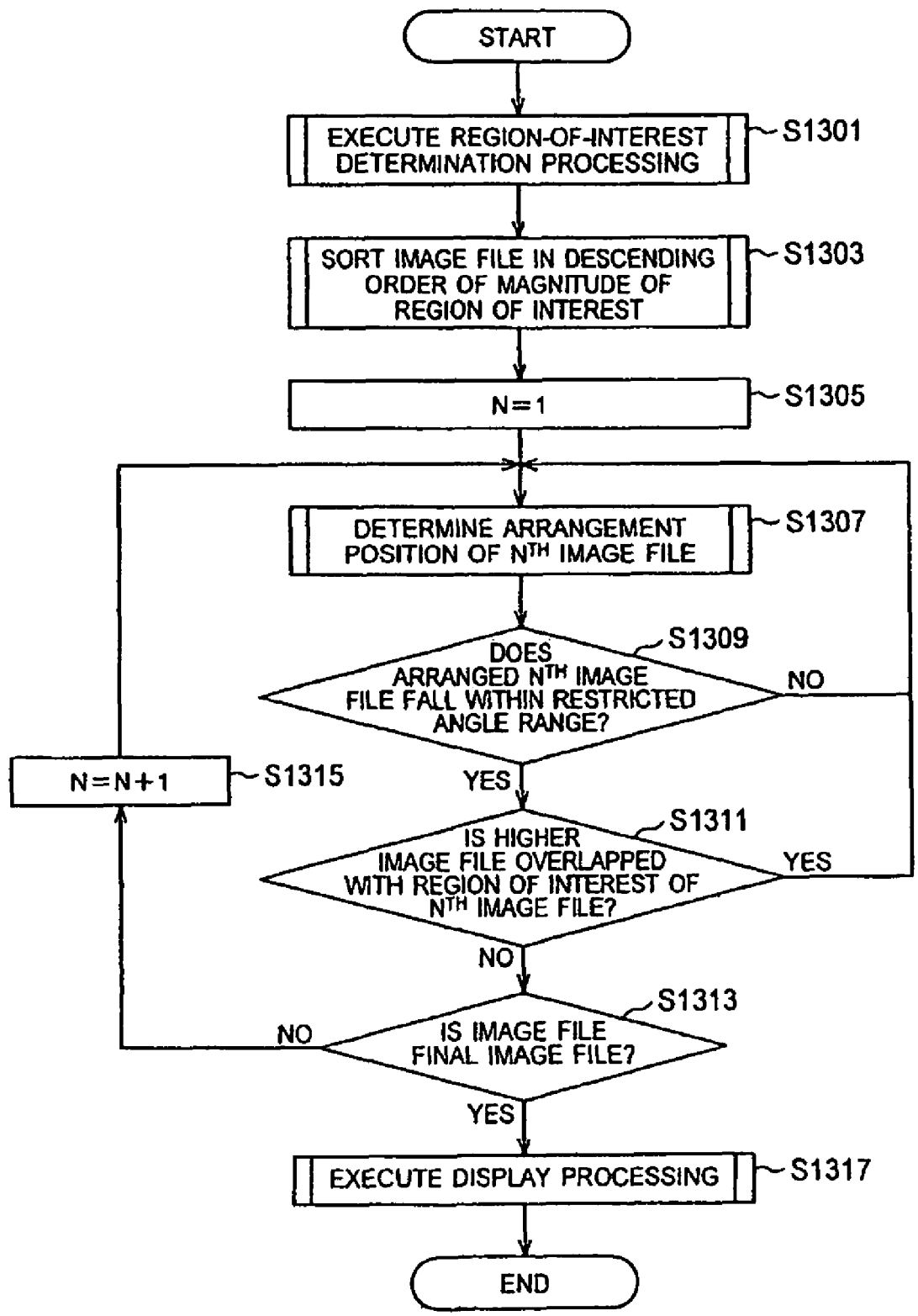
FIG. 23 is a flowchart which depicts a processing flow for an overlap display processing.

FIG. 23 is a flowchart which depicts a processing flow for an overlap display processing.

This processing is executed when the user selects display of a list of image files while overlapping them with one another. When the processing starts, a step S1301 is executed.

In the step S1301, the region-of-interest determination processing described with reference to FIG. 21 is called. This region-of-interest determination processing is executed for all display target image files. Thereafter, a step S1303 is executed.

In the step S1303, in response to the region-of-interest determination processing in the step S1301, a processing for rearranging the image files in a descending order of magnitudes of the regions of interest of the respective image files is executed. Thereafter, a step S1305 is executed.

In the step S1305, a variable N that indicates an image file is set at 1 that indicates a leading image file. This signifies that as N is larger, the image file is displayed while being overlapped with the other image files at a lower position. Thereafter, a step S1307 is executed.

In the step S1307, a processing for determining the position of the image file indicated by the variable N is executed. To determine the position of the image file, coordinates of the position are obtained by random numbers. In the determination of the position of the image file, the coordinates thereof are selected so that the region of interest is exposed as much as possible and so that the region of no interest is hidden by the higher image files as much as possible. Thereafter, a step S1309 is executed.

In the step S1309, it is determined whether the arranged image file falls within a restricted angle range. If an image display angle is excessively wide, the user feels the impression that the image is difficult to view. If it is determined that the image file is out of the restricted angle range, the processing returns to the step S1307. If it is determined that the image file falls within the restricted angle range, the processing goes to a step S1311.

In the step S1311, it is determined whether a higher image file is overlapped with the region of interest of the arranged target image file. If it is determined that the higher image file is overlapped with the region of interest of the target image file, the processing returns to the step S1307. If it is determined that the higher image file is not overlapped with the region of interest of the target image file, the processing goes to a step S1313.

In the step S1313, the processing is branched depending on whether the variable N indicates a final image file of the display target image files. Namely, if the image file is the final image file, the processing goes to a step S1317. If the image file is not the final image, the processing goes to a step S1315.

In the step S1315, the variable N is incremented by one, whereby the processing for determining the arrangement position of the next image file is executed.

In the step S1317, since the arrangement positions of all the display target image files are determined, a processing for allowing the image display unit 1201 to display a list of image files while overlapping them with one another is called. After displaying the list, the processing is finished.

Figure 24:
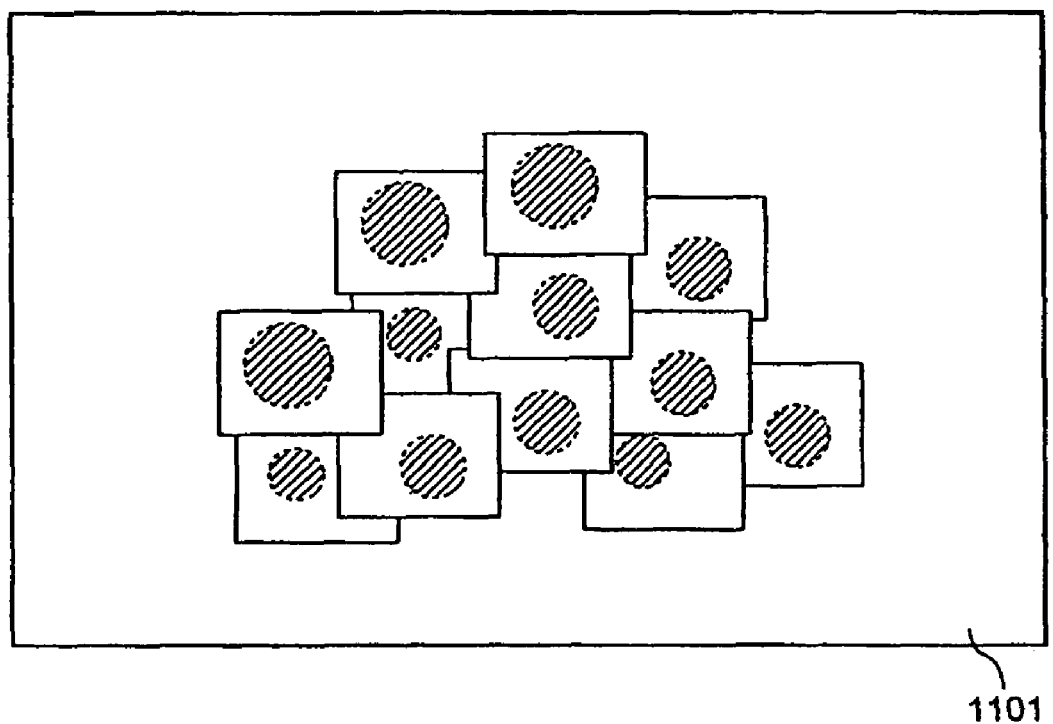
FIG. 24 depicts one example of displaying an image list while images are overlapped.

FIG. 24 depicts one example of displaying the list of image files while overlapping the image files with one another. As is obvious from FIG. 24, all the regions of interest of the respective image files appear on the image display unit 1201 without being hidden.

Fifth Embodiment

An image display apparatus according to a fifth embodiment of the present invention is basically equal in configuration to that according to the fourth embodiment except that the focal position information has preference over the face detection processing in the region-of-interest determination processing described with reference to FIG. 21.

Figure 25:
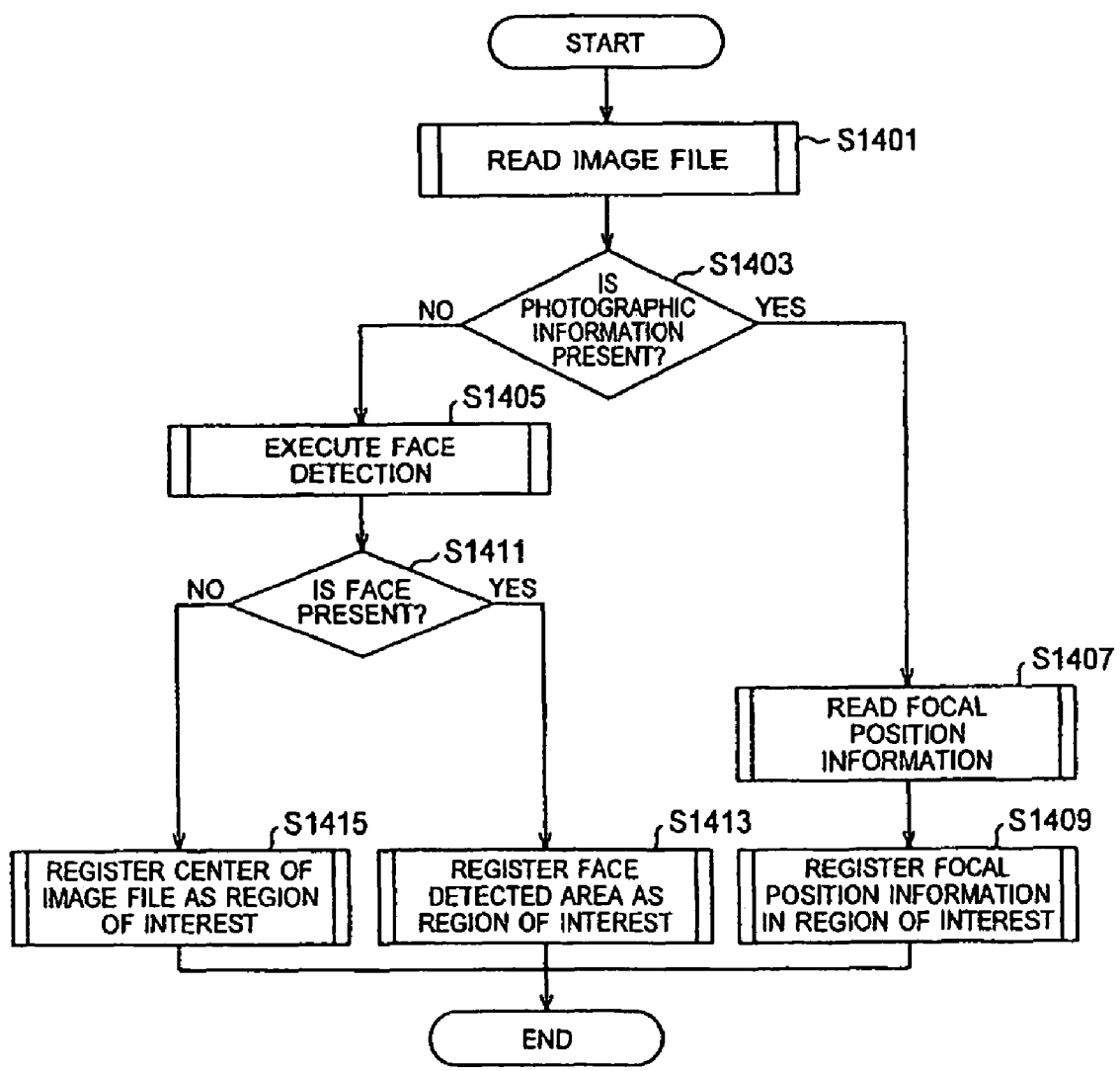
FIG. 25 is a flowchart which depicts a processing flow for a region-of-interest determination processing according to a fifth embodiment.

FIG. 25 is a flowchart which depicts a processing flow for the region-of-interest determination processing according to this embodiment.

This processing is executed before the control over display of a list of image files while overlapping the image files with one another. When the processing starts, a step S1401 is executed.

In the step S1401, the image files are read from the image storage unit 1205, the memory card 1207, and the external input terminal 1209, decoded by the image decoder unit 211, and stored in the cache memory 215. Thereafter, a step 1403 is executed.

In the step S1403, the processing is branched depending on whether the Exif information is included in the target image file. If the Exif information is present, the processing goes to a step S1407. If no Exif information is present, the processing goes to a step S1405.

In the step S1405, the face detection processing performed by the face detection processing unit 1203 and described with reference to FIG. 18 is called for the read image file. Thereafter, the processing goes to a step S1411.

In the step S1407, the Exif information is read from the target image file, and focal position information is further read from the Exif information. Thereafter, a step S1409 is executed.

In the step S1409, the processing for converting the focal position information described with reference to FIGS. 20A and 20B into a focal position region is executed. This focal position region is registered as the region of interest. After the registration, this processing is finished.

In the step S1411, the processing is branched depending on whether the face area is present based on the face detection processing result. If the face area is present, the processing goes to a step S1413. If the face area is not present, the processing goes to a step S1415.

In the step S1413, face area data stored in the cache memory is registered as region-of-interest data on the target image file since it is determined that the face area is present in the target image file. After the registration, this processing is finished.

In the step S1415, a central position of the image file is registered as the region of interest since no face area is present in the target image file and no Exif information can be acquired from the target image file. After the registration, the processing is finished.

Sixth Embodiment

An image display apparatus according to a sixth embodiment is basically equal in configuration to that according to the fourth embodiment except that the region of interest is a logical OR between a face detection region and picture-taking information.

Figure 26:
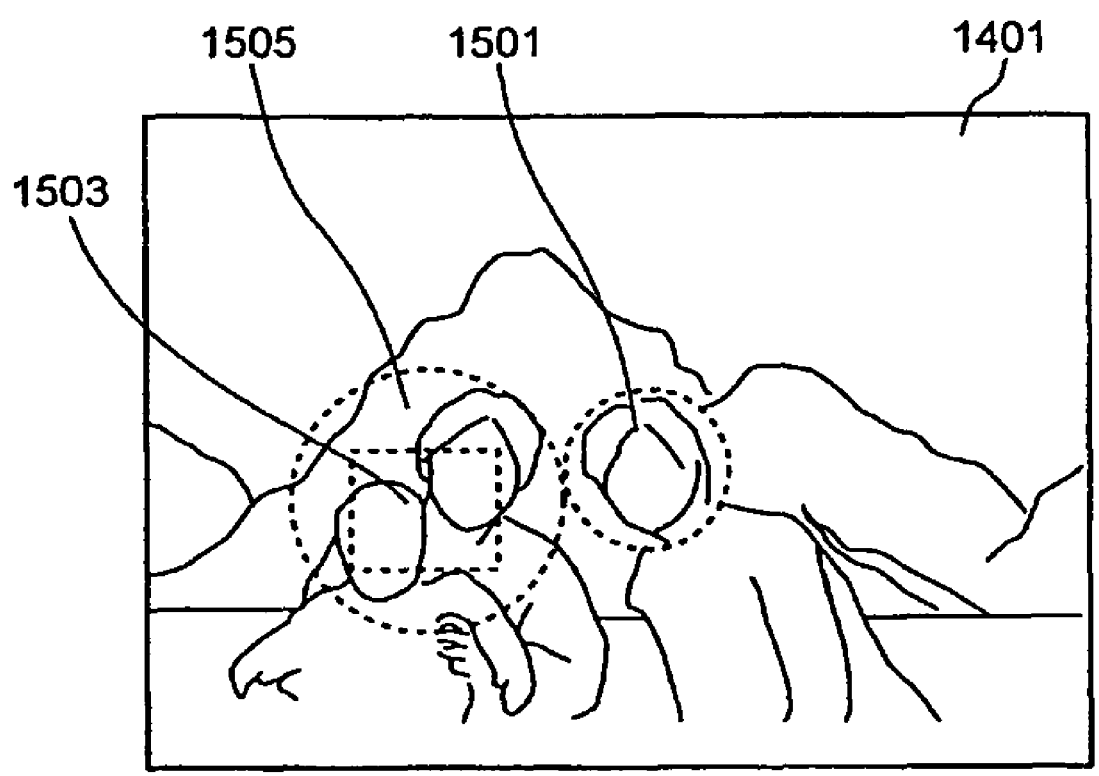
FIG. 26 depicts a result of detecting a region of interest according to a sixth embodiment.

FIG. 26 depicts a result of detecting the region of interest. In FIG. 26, a region 1501 is a region of interest obtained by the face detection processing, a region 1503 is a focal region, and a region 1505 is a region of interest converted from the focal region 1503. In this embodiment, the region of interest is a logical OR between the region 1501 and the region 1505.

Seventh Embodiment

Figure 27:
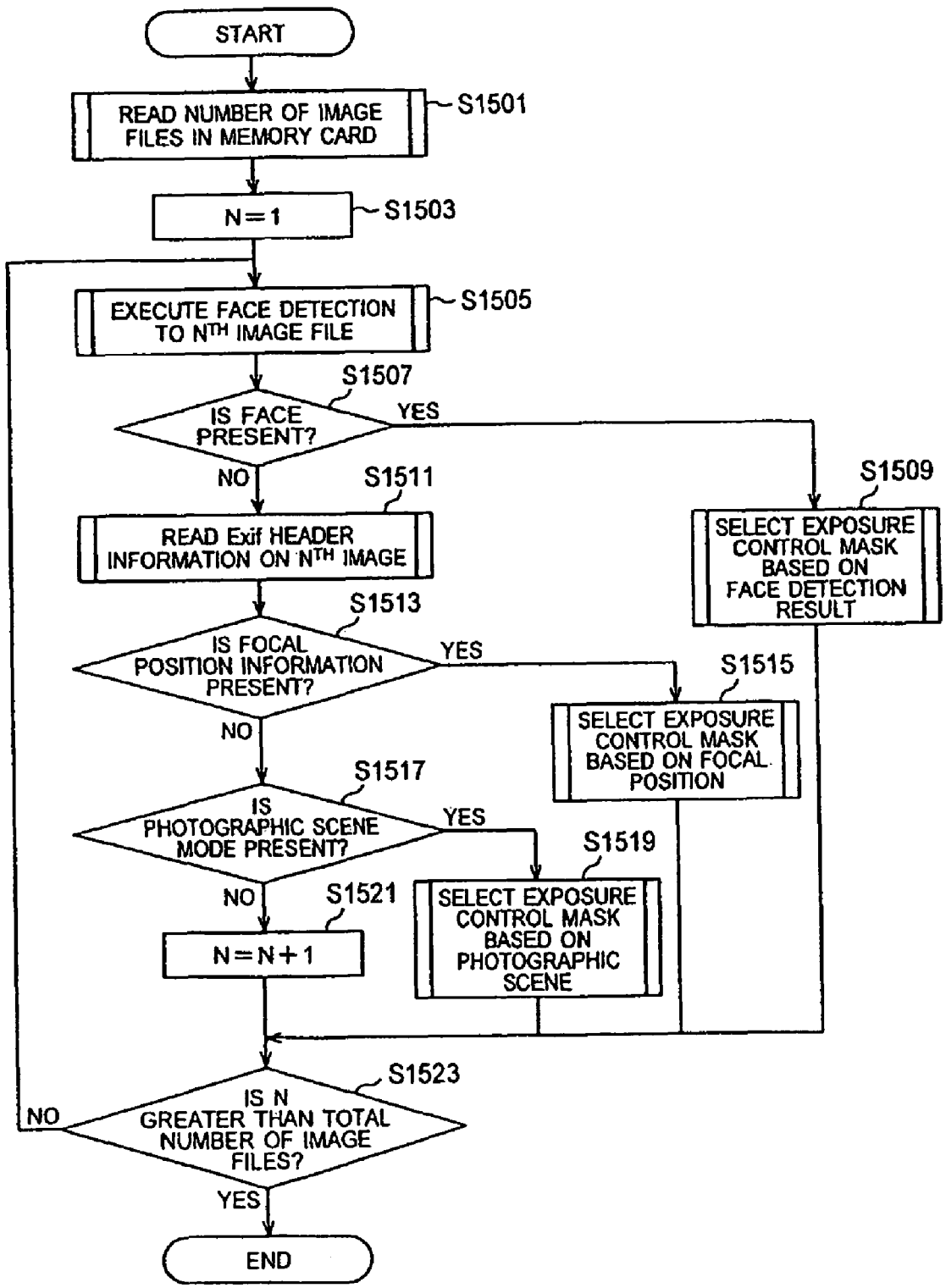
FIG. 27 is a flowchart which depicts an operation flow of a display control unit 110 according to a seventh embodiment of the present invention.

An image display apparatus according to a seventh embodiment is basically equal in configuration to that according to the second embodiment except that the operation flow of display control unit 110 differs. FIG. 27 is a flowchart which depicts the processing flow of the display control unit 110 according to this embodiment. Types of an exposure control mask employed in the processing shown in FIG. 27 are equal to those shown in FIG. 8. Exposure control masks different in exposure amount and exposure position are prepared according to focal positions or photographic scene modes. The processing operations of the display control unit 110 will be described with reference to FIGS. 27 and 8A to 8C.

The display control unit 110 acquires the total number of image files recorded in the memory card (in a step S1501), and executes a face detection processing to first image data (in steps S1503 and S1505).

If a face is detected in the target image file ("Yes" in a step S1507), the display control unit 110 selects an exposure control mask having a focal position corresponding to the focal position information from among three masks shown in FIG. 8A, i.e., the left exposure mask, the center exposure mask, and the right exposure mask (in a step S1509).

If no face is detected in the target image file ("No" in the step S1507), the display control unit 110 determines whether focal position information is present in the target image file (in a step S1513). If the focal position information is present, the display control unit 110 selects one of the exposure control masks shown in FIG. 8A (in a step S1515).

If no focal position information is present ("No" in the step S1513), the display control unit 110 reads Exif information and determines whether photographic scene information is present (in a step S1517). If the photographic scene information is present ("Yes" in the step S1517), the display control unit 110 selects an exposure control mask corresponding to the photographic scene mode information (in a step S1519).

For subsequent image files, the display control unit 110 carries out the same processings to determine the exposure control masks for the respective image data (in steps S1523, S1505, and the following).

What is claimed is:

1. An image display method of displaying a plurality of images on a screen with overlaps, the method comprising the steps of:
   specifying a face area of an object contained in each of the plurality of images by means of automatic face detection;
   determining a display position on the screen of each of the plurality of images, so such that the specified face area of an image is not hidden by other images; and
   displaying the plurality of images on the screen with overlaps in accordance with the determined display position of each image,
   wherein said determining step includes determining the display position on the screen of the image such that a partial area including a focal position of an image is not hidden by other images, when no face area of any object contained in an image is specified in said specifying step.

2. An image display apparatus for displaying a plurality of images on a screen with overlaps, comprising:
   a face specifying unit that specifies a face area of an object contained in each of the plurality of images by means of automatic face detection;
   a determination unit that determines a display position on the screen of each of the plurality of images, such that the specified face area of an image is not hidden by other images; and
   a displaying unit that displays the plurality of images on the screen with overlaps in accordance with the determined display position of each image,
   wherein said determination unit further determines the display position on the screen of an image such that a partial area including a focal position of an image is not hidden by other images when no face area of any object contained in an image is specified by said face specifying unit.

3. An image display method of displaying a plurality of images on a screen with overlaps, the method comprising the steps of:
   specifying a face area of an object contained in each of the plurality of images by means of automatic face detection;
   determining a display position on the screen of each of the plurality of images such that the specified face area of an image is not hidden by other images; and
   displaying the plurality of images on the screen with overlaps in accordance with the determined display position of each image,
   wherein said determining step includes determining the display position on the screen of the image such that a partial area including a central position of an image is not hidden by other images, when no face area of any object contained in an image is specified in said specifying step.

4. An image display apparatus for displaying a plurality of images on a screen with overlaps, comprising:
   a face specifying unit that specifies a face area of an object contained in each of the plurality of images by means of automatic face detection;
   a determination unit that determines a display position on the screen of each of the plurality of images such that the specified face area of each image is not hidden by other images; and
   a displaying unit that displays the plurality of images on the screen with overlaps in accordance with the determined display position of each image, wherein said determination unit further determines the display position on the screen of the image such that a partial area including a central position of an image is not hidden by other images, when no face area of any object contained in an image is specified by said face specifying unit.

5. An image display method according to claim 1, wherein said determining step includes determining the display position on the screen of an image such that a partial area including a plurality of focal positions of the image is not hidden by other images, when no face area of any object contained in an image is specified in said specifying step.

6. An image display method according to claim 1, wherein said determining step includes determining the display position on the screen of an image such that a partial area including a central position of an image is not hidden by other images, when no focal position of the image is acquired.

7. A non-transitory computer-readable medium storing a computer-executable program for causing a computer to perform a method according to claim 1.

8. An image display apparatus according to claim 2, wherein said determination unit determines the display position on the screen of an image such that a partial area including a plurality of focal positions of an image is not hidden by other images, when no face area of any object contained in an image is specified by said specifying unit.

9. An image display apparatus according to claim 2, wherein said determination unit further determines the display position on the screen of an image such that a partial area including a central position of an image is not hidden by other images, when no focal position of an image is acquired.

10. A non-transitory computer-readable medium storing a computer-executable program for causing a computer to perform a method according to claim 3.

* * * * *